US010880365B2

(12) United States Patent
Yamamoto

(10) Patent No.: US 10,880,365 B2
(45) Date of Patent: Dec. 29, 2020

(54) INFORMATION PROCESSING APPARATUS, TERMINAL APPARATUS, AND METHOD OF PROCESSING INFORMATION

(71) Applicant: Ricoh Company, Ltd., Tokyo (JP)

(72) Inventor: Taichi Yamamoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 23 days.

(21) Appl. No.: 16/269,602

(22) Filed: Feb. 7, 2019

(65) Prior Publication Data

US 2019/0281111 A1 Sep. 12, 2019

(30) Foreign Application Priority Data

Mar. 8, 2018 (JP) .................. 2018-042172
Nov. 20, 2018 (JP) .................. 2018-216950

(51) Int. Cl.
*H04L 29/08* (2006.01)
*G06T 1/20* (2006.01)
*G06F 3/12* (2006.01)

(52) U.S. Cl.
CPC ........ *H04L 67/1008* (2013.01); *G06F 3/1224* (2013.01); *G06T 1/20* (2013.01); *H04L 67/02* (2013.01)

(58) Field of Classification Search
CPC ................ H04L 67/02; H04L 43/04
See application file for complete search history.

(56) References Cited

U.S. PATENT DOCUMENTS

| 9,436,593 | B2* | 9/2016 | Yoshida | G06F 9/5016 |
|---|---|---|---|---|
| 10,527,993 | B2* | 1/2020 | Itoh | G03G 15/502 |
| 10,621,070 | B2* | 4/2020 | Kumagai | G06F 11/2273 |
| 2010/0214433 | A1* | 8/2010 | Takahashi | G03B 5/00 348/223.1 |
| 2011/0072082 | A1* | 3/2011 | Fujiwaka | G06F 9/5044 709/203 |

(Continued)

FOREIGN PATENT DOCUMENTS

JP 2007-249517 9/2007
JP 2016-024471 2/2016

(Continued)

*Primary Examiner* — Lashonda T Jacobs
(74) *Attorney, Agent, or Firm* — Xsensus LLP

(57) ABSTRACT

An information processing apparatus includes circuitry configured to receive processing request information indicating contents of a specific processing from a terminal apparatus connected to the information processing apparatus via a network, determine allocation of processing for performing the specific processing indicated in the processing request information by allocating first processing to be performed by the information processing apparatus and second processing to be performed by the terminal apparatus based on terminal information indicating specification of the terminal apparatus, the first processing and the second processing constituting the specific processing, transmit, to the terminal apparatus, allocation information indicating the second processing allocated to the terminal apparatus, and perform the first processing allocated to the information processing apparatus.

10 Claims, 20 Drawing Sheets

(56) References Cited

U.S. PATENT DOCUMENTS

| | | | | |
|---|---|---|---|---|
| 2011/0126055 A1* | 5/2011 | Shimada | ............. | G06F 11/0727 |
| | | | | 714/37 |
| 2012/0161962 A1* | 6/2012 | Sano | ........................ | G01S 19/09 |
| | | | | 340/539.13 |
| 2014/0359115 A1* | 12/2014 | Hayashida | ........... | A61B 5/0077 |
| | | | | 709/224 |
| 2016/0139959 A1* | 5/2016 | Iwata | ..................... | G06F 9/5027 |
| | | | | 718/103 |
| 2016/0156575 A1* | 6/2016 | Jeong | ....................... | H04L 51/10 |
| | | | | 709/206 |
| 2016/0334885 A1* | 11/2016 | Togawa | ................ | A63F 13/245 |

FOREIGN PATENT DOCUMENTS

| | | |
|---|---|---|
| JP | 2016-099960 | 5/2016 |
| WO | WO2009/139426 A1 | 11/2009 |

\* cited by examiner

FIG. 5

| ITEM | SPECIFICATION |
|---|---|
| CPU | Snapdragon845 |
| RAM | 4GB |
| GPU | Adreno 530 |
| ... | ... |

FIG. 6

| FEATURE VALUE | REGISTRATION NAME |
|---|---|
| Face1 | MR. A |
| Face2 | MR. SMITH |
| Face3 | MR. B |
| Face4 | MISS C |
| ... | ... |

FIG. 7

| ITEM | OPERATING STATE |
|---|---|
| CPU | 40% |
| MEMORY | 32GB/64GB |
| STORAGE | 1.4TB/16TB |
| POWER SOURCE (UNINTERRUPTIBLE POWER SOURCE) | 80% |
| Socket COMMUNICATION (NUMBER OF CONNECTED CLIENTS) | 3 |
| ... | ... |

FIG. 8

| ITEM | CONDITION |
|---|---|
| CPU | Snapdragon845 |
| RAM | ≥4GB |
| GPU | Adreno 540 |
| ... | ... |

FIG. 9

| ITEM | CONDITION |
|---|---|
| CPU | >80% |
| MEMORY | >16GB |
| STORAGE | >1.8TB |
| POWER SOURCE (UNINTERRUPTIBLE POWER SOURCE) | ≤10% |
| Socket COMMUNICATION (NUMBER OF CONNECTED CLIENTS) | >5 |
| ... | ... |

FIG. 10A

PERFORMANCE OF SERVER: HIGH

| PROCESSING INFORMATION | | | ALLOCATION RATIO | |
|---|---|---|---|---|
| PROCESS NAME | PROCESS CONTENTS | TARGET OF ALLOCATION | PERFORMANCE OF TERMINAL: HIGH | PERFORMANCE OF TERMINAL: LOW |
| BLUR PROCESSING | TASK 1: FACIAL DETECTION | TASK 2: MATCHING DETECTED FACE | ⟨ALLOCATION RATIO⟩ TERMINAL: 75% SERVER: 25% | ⟨ALLOCATION RATIO⟩ TERMINAL: 30% SERVER: 70% |
| | TASK 2: MATCHING DETECTED FACE | | | |
| | TASK 3: FACE BLURRING | | | |
| POSITION IDENTIFICATION PROCESSING | TASK 1: DETECTION OF SPECIFIC TARGET | TASK 1: DETECTION OF SPECIFIC TARGET | ⟨ALLOCATION RATIO⟩ TERMINAL: 60% SERVER: 40% | ⟨ALLOCATION RATIO⟩ TERMINAL: 40% SERVER: 60% |
| | TASK 2: POSITION DETECTION | | | |
| ... | | ... | ... | ... |

FIG. 10B

PERFORMANCE OF SERVER: LOW (OR NORMAL) 65Ab (65A)

| PROCESSING INFORMATION | | TARGET OF ALLOCATION | ALLOCATION RATIO | |
|---|---|---|---|---|
| PROCESS NAME | PROCESS CONTENTS | | PERFORMANCE OF TERMINAL: HIGH | PERFORMANCE OF TERMINAL: LOW |
| BLUR PROCESSING | TASK 1: FACIAL DETECTION | | | |
| | TASK 2: MATCHING DETECTED FACE | TASK 2: MATCHING DETECTED FACE | \<ALLOCATION RATIO\> TERMINAL: 90% SERVER: 10% | \<ALLOCATION RATIO\> TERMINAL: 50% SERVER: 50% |
| | TASK 3: FACE BLURRING | | | |
| POSITION IDENTIFICATION PROCESSING | TASK 1: DETECTION OF SPECIFIC TARGET | TASK 1: DETECTION OF SPECIFIC TARGET | \<ALLOCATION RATIO\> TERMINAL: 80% SERVER: 20% | \<ALLOCATION RATIO\> TERMINAL: 50% SERVER: 50% |
| | TASK 2: POSITION DETECTION | | | |
| ... | | ... | ... | ... |

PROCESS NAME: BLUR PROCESSING

PROCESS CONTENTS:
  TASK 1: FACIAL DETECTION
  TASK 2: MATCHING DETECTED FACE
  TASK 3: FACE BLURRING

TARGET OF ALLOCATION: TASK 2
  MATCHING DETECTED FACES USING CLIENT TERMINAL
  AND SERVER THAT USE APPLICATION PROCESSING
  INFORMATION 30

FIG. 15A

PERFORMANCE OF SERVER: HIGH

| TERMINAL IDENTIFI-CATION INFORMATION | PROCESSING INFORMATION | | TARGET OF ALLOCATION | ALLOCATION RATIO | |
|---|---|---|---|---|---|
| | PROCESS NAME | PROCESS CONTENTS | | PERFORMANCE OF TERMINAL: HIGH | PERFORMANCE OF TERMINAL: LOW |
| 0101x | BLUR PROCESSING | TASK 1: FACIAL DETECTION<br>TASK 2: MATCHING DETECTED FACE<br>TASK 3: FACE BLURRING | TASK 2: MATCHING DETECTED FACE | \<ALLOCATION RATIO\><br>TERMINAL: 50%<br>SERVER: 50% | \<ALLOCATION RATIO\><br>TERMINAL: 30%<br>SERVER: 70% |
| 0202y | BLUR PROCESSING | TASK 1: DETECTION OF SPECIFIC TARGET<br>TASK 2: MATCHING DETECTED FACE<br>TASK 3: FACE BLURRING | TASK 2: MATCHING DETECTED FACE | \<ALLOCATION RATIO\><br>TERMINAL: 60%<br>SERVER: 40% | \<ALLOCATION RATIO\><br>TERMINAL: 40%<br>SERVER: 60% |
| ... | ... | ... | ... | ... | ... |

PERFORMANCE OF SERVER: LOW (OR NORMAL)                                                                65Bb (65B)

| TERMINAL IDENTIFI-CATION INFORMATION | PROCESSING INFORMATION ||| ALLOCATION RATIO ||
|---|---|---|---|---|---|
| | PROCESS NAME | PROCESS CONTENTS | TARGET OF ALLOCATION | PERFORMANCE OF TERMINAL: HIGH | PERFORMANCE OF TERMINAL: LOW |
| 0101x | BLUR PROCESSING | TASK 1: FACIAL DETECTION | TASK 2: MATCHING DETECTED FACE | <ALLOCATION RATIO> TERMINAL: 80% SERVER: 10% | <ALLOCATION RATIO> TERMINAL: 50% SERVER: 50% |
| | | TASK 2: MATCHING DETECTED FACE | | | |
| | | TASK 3: FACE BLURRING | | | |
| 0202y | BLUR PROCESSING | TASK 1: DETECTION OF SPECIFIC TARGET | TASK 2: MATCHING DETECTED FACE | <ALLOCATION RATIO> TERMINAL: 90% SERVER: 10% | <ALLOCATION RATIO> TERMINAL: 50% SERVER: 50% |
| | | TASK 2: MATCHING DETECTED FACE | | | |
| | | TASK 3: FACE BLURRING | | | |
| ... | ... | ... | ... | ... | ... |

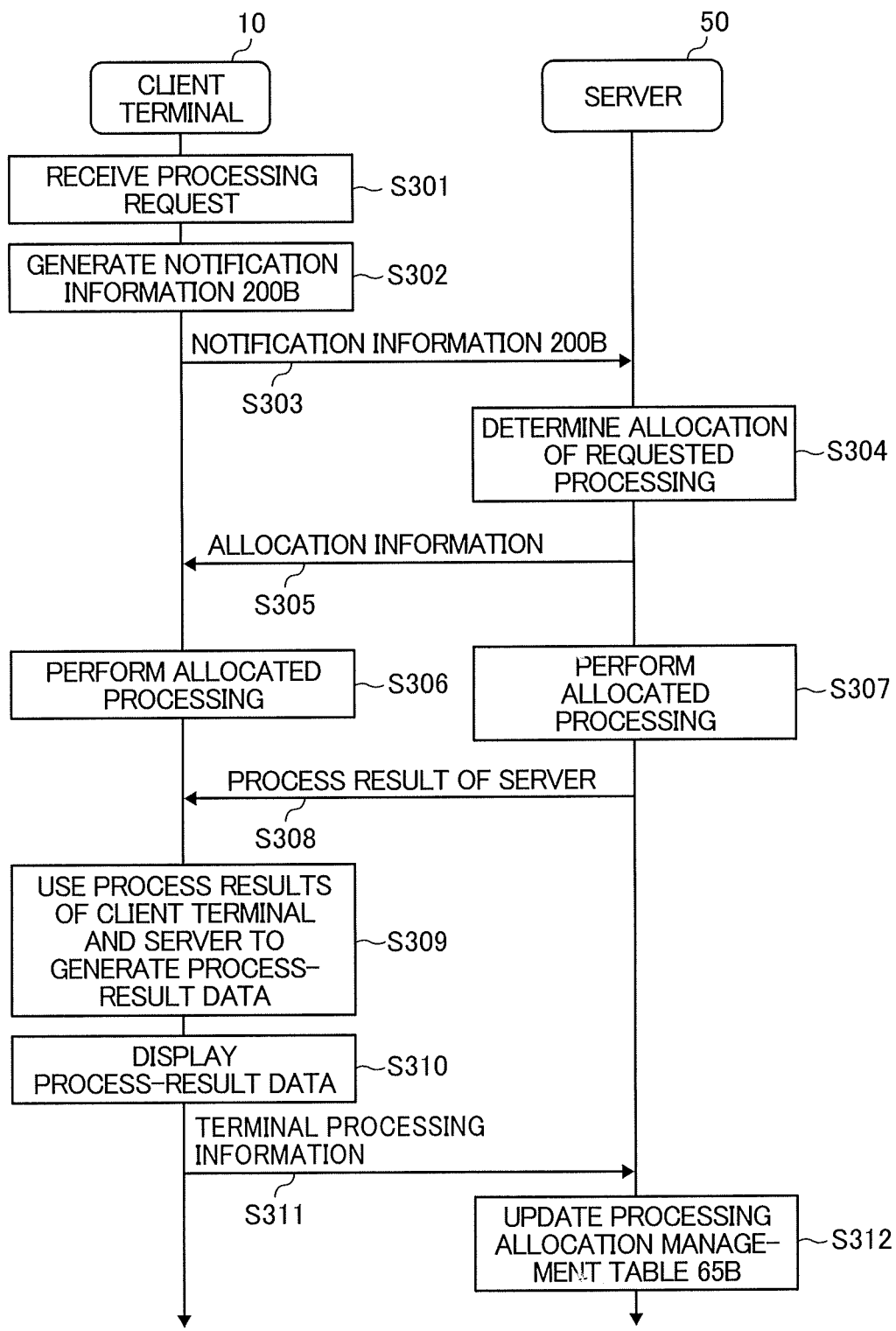

FIG. 18A

PERFORMANCE OF SERVER: HIGH

| USER IDENTIFI-CATION INFORMATION | PROCESSING INFORMATION | | | ALLOCATION RATIO | |
|---|---|---|---|---|---|
| | PROCESS NAME | PROCESS CONTENTS | TARGET OF ALLOCATION | PERFORMANCE OF TERMINAL: HIGH | PERFORMANCE OF TERMINAL: LOW |
| user1 | BLUR PROCESSING | TASK 1: FACIAL DETECTION | TASK 2: MATCHING DETECTED FACE | <ALLOCATION RATIO> TERMINAL: 50% SERVER: 50% | <ALLOCATION RATIO> TERMINAL: 30% SERVER: 70% |
| | | TASK 2: MATCHING DETECTED FACE | | | |
| | | TASK 3: FACE BLURRING | | | |
| user2 | BLUR PROCESSING | TASK 1: DETECTION OF SPECIFIC TARGET | TASK 2: MATCHING DETECTED FACE | <ALLOCATION RATIO> TERMINAL: 60% SERVER: 40% | <ALLOCATION RATIO> TERMINAL: 40% SERVER: 60% |
| | | TASK 2: MATCHING DETECTED FACE | | | |
| | | TASK 3: FACE BLURRING | | | |
| ... | ... | ... | ... | ... | ... |

PERFORMANCE OF SERVER: LOW (OR NORMAL)

| USER IDENTIFI- CATION INFORMATION | PROCESSING INFORMATION ||| ALLOCATION RATIO ||
| --- | --- | --- | --- | --- | --- |
| | PROCESS NAME | PROCESS CONTENTS | TARGET OF ALLOCATION | PERFORMANCE OF TERMINAL: HIGH | PERFORMANCE OF TERMINAL: LOW |
| user1 | BLUR PROCESSING | TASK 1: FACIAL DETECTION | | <ALLOCATION RATIO> TERMINAL: 80% SERVER: 10% | <ALLOCATION RATIO> TERMINAL: 50% SERVER: 50% |
| | | TASK 2: MATCHING DETECTED FACE | TASK 2: MATCHING DETECTED FACE | | |
| | | TASK 3: FACE BLURRING | | | |
| user2 | BLUR PROCESSING | TASK 1: DETECTION OF SPECIFIC TARGET | | <ALLOCATION RATIO> TERMINAL: 90% SERVER: 10% | <ALLOCATION RATIO> TERMINAL: 50% SERVER: 50% |
| | | TASK 2: MATCHING DETECTED FACE | TASK 2: MATCHING DETECTED FACE | | |
| | | TASK 3: FACE BLURRING | | | |
| ... | ... | ... | ... | ... | ... |

65Cb (65C)

INFORMATION PROCESSING APPARATUS, TERMINAL APPARATUS, AND METHOD OF PROCESSING INFORMATION

CROSS-REFERENCE TO RELATED APPLICATION

This application claims priority pursuant to 35 U.S.C. § 119(a) to Japanese Patent Application Nos. 2018-042172, filed on Mar. 8, 2018 and 2018-216950, Nov. 20, 2018 in the Japan Patent Office, the disclosures of which are incorporated by reference herein in their entirety.

TECHNICAL FIELD

This disclosure relates to an information processing apparatus, a terminal apparatus, and a method of processing information.

BACKGROUND ART

Internet of Things (IoT) have been applied to various fields. For example, large-scale communication systems using cloud computing have been constructed. In these communication systems, client terminals acquire a request for processing image data and audio data, transmit the acquired processing request to servers via the Internet, and the servers perform various processing.

SUMMARY

In one aspect of the present invention, an information processing apparatus system is devised. The information processing apparatus includes circuitry configured to receive processing request information indicating contents of a specific processing from a terminal apparatus connected to the information processing apparatus via a network, determine allocation of processing for performing the specific processing indicated in the processing request information by allocating first processing to be performed by the information processing apparatus and second processing to be performed by the terminal apparatus based on terminal information indicating specification of the terminal apparatus, the first processing and the second processing constituting the specific processing, transmit, to the terminal apparatus, allocation information indicating the second processing allocated to the terminal apparatus, and perform the first processing allocated to the information processing apparatus.

In another aspect of the present invention, a terminal apparatus is devised. The terminal apparatus includes circuitry configured to receive a request for a specific processing, transmit processing request information indicating contents of the specific processing to an information processing apparatus connected to the terminal apparatus via a network, receive, from the information processing apparatus, allocation information indicating second processing allocated to the terminal apparatus, the information processing apparatus determining an allocation of the second processing to be performed by the terminal apparatus and first processing to be performed by the information processing apparatus based on terminal information indicating specification of the terminal apparatus, the first processing and the second processing constituting the specific processing indicated by the processing request information, perform the second processing allocated to the terminal apparatus to obtain a second result of the second processing, receive a first result of the first processing performed by the information processing apparatus, and generate process-result data for the specific processing based on the second result of the second processing performed by the terminal apparatus and the first result of the first processing performed by the information processing apparatus.

In another aspect of the present invention, a method of processing information at a terminal apparatus is devised. The method includes receiving a request for a specific processing, transmitting processing request information indicating contents of the specific processing to an information processing apparatus connected to the terminal apparatus via a network, receiving, from the information processing apparatus, allocation information indicating second processing allocated to the terminal apparatus, the information processing apparatus determining an allocation of the second processing to be performed by the terminal apparatus and first processing to be performed by the information processing apparatus based on terminal information indicating specification of the terminal apparatus, the first processing and the second processing constituting the specific processing indicated by the processing request information, performing the second processing allocated to the terminal apparatus to obtain a second result of the second processing, receiving a first result of the first processing performed by the information processing apparatus, and generating process-result data for the specific processing based on the second result of the second processing performed by the terminal apparatus and the first result of the first processing performed by the information processing apparatus.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 5 is an example of terminal information of the client terminal according to the first embodiment;

FIG. 6 is an example of application processing information according to the first embodiment;

FIG. 7 is an example of operating state information of the server according to the first embodiment;

FIG. 8 is an example of a terminal performance management table according to the first embodiment;

FIG. 9 is an example of a server performance management table according to the first embodiment;

FIGS. 10A and 10B (FIG. 10) are examples of processing allocation management table according to the first embodiment;

FIGS. 15A and 15B (FIG. 15) are examples of processing allocation management table according to a second embodiment;

FIG. 16 is an example of a sequence diagram illustrating a method of processing information in an information processing system according to the second embodiment;

FIGS. 18A and 18B (FIG. 18) are examples of processing allocation management table according to a third embodiment;

Figure 1:
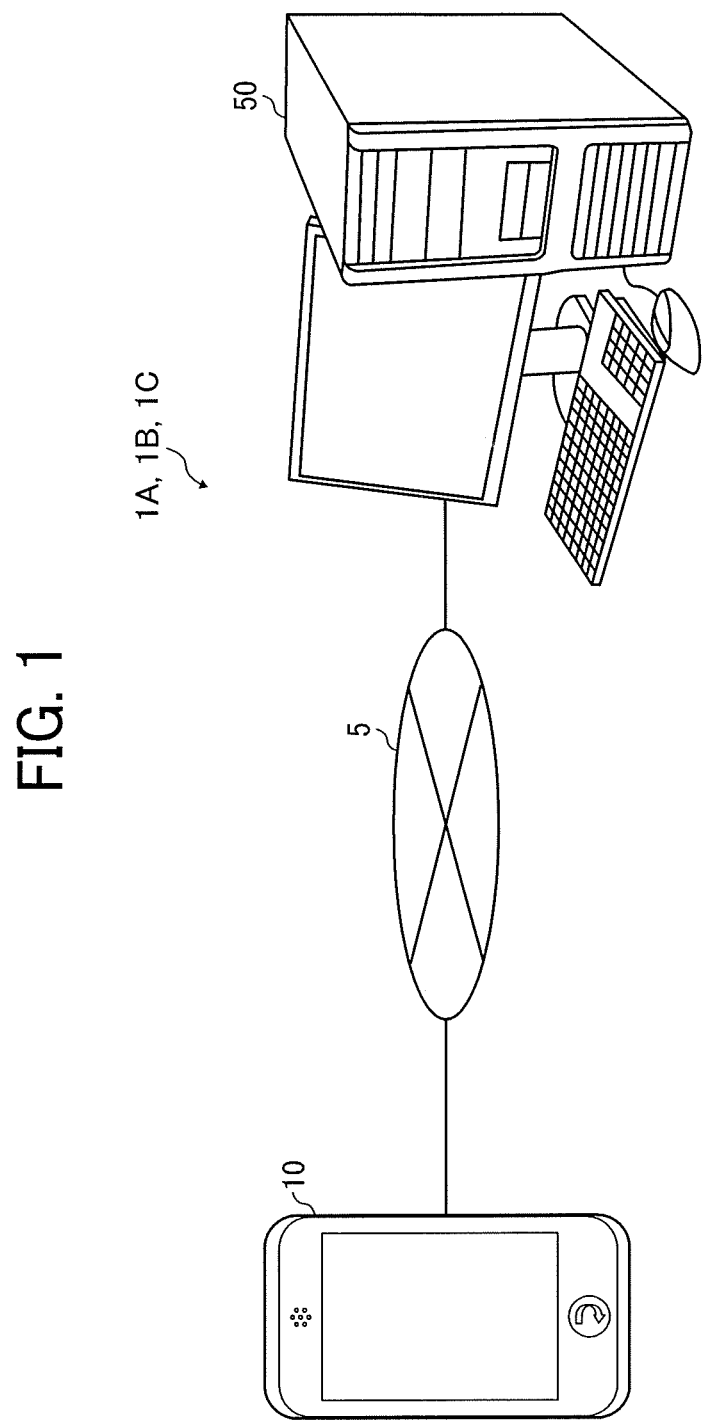
FIG. 1 is an example of a system configuration of an information processing system according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of a configuration for carrying out the invention with reference to the drawings. It should be noted that the same reference numerals are assigned to the same elements in the description of the drawings, and the overlapping descriptions will be omitted.

First Embodiment

System Configuration:

FIG. 1 is an example of a system configuration of an information processing system 1A according to a first embodiment. As illustrated in FIG. 1, the information processing system 1A includes, for example, a client terminal 10 and a server 50 connected via a communication network 5, in which the client terminal 10 and the server 50 can perform processing of one or more applications in cooperation with each other. Further, the information processing system 1A can effectively utilize processing resources of the client terminal 10 and the server 50 when performing a specific processing using one or more applications requested by a user. Information processing systems 1B and 1C respectively corresponding to a second embodiment and third embodiment are to be described in detail later in this description.

The information processing system 1A includes, for example, the client terminal 10 and the server 50. The client terminal 10 and the server 50 are communicatively connected with each other via a communication network 5.

The communication network 5 is a communication network using the Internet or local area network (LAN) or the like. Further, the communication network 5 can be a communication network connecting an intranet and the Internet via a firewall.

The client terminal 10 is a terminal apparatus or device, such as a smartphone, used by a user of the information processing system 1A. The client terminal 10 is installed with one or more applications and performs processing of one or more applications in cooperation with the server 50 via the communication network 5.

The client terminal 10 performs one or more image processing on image data captured by complementary metal oxide semiconductor (CMOS) sensors 105 and 112 or an external image capture device, such as a digital camera, in cooperation with the server 50. The image processing on image data includes, for example, blur processing, mosaic processing, masking processing, trimming processing, object recognition processing (e.g., facial recognition processing), distortion correction, and the like.

The client terminal 10 is not limited to a smart phone, but can be, for example, a mobile phone terminal, a tablet personal computer (PC), a notebook PC, a desktop PC, a wearable PC, and an image capture device such as a digital camera.

The server 50 performs processing of one or more applications in cooperation with the client terminal 10 via the communication network 5. The server 50 can execute cloud applications corresponding to the applications installed on the client terminal 10. The server 50 is described as an example of information processing apparatuses in this description.

The processing performed by the applications of the client terminal 10 and the applications of the server 50 is not limited to the image processing on image data, but includes, for example, one or more processing common to the applications of the client terminal 10 and the applications of the server 50, or one or more processing that can be performed in a cooperative manner by the applications of the client terminal 10 and the applications of the server 50.

FIG. 1 illustrates an example case that the client terminal 10 (one terminal apparatus) is connected to the server 50 via the communication network 5, but the server 50 can be configured to be connected to a plurality of client terminals 10 via the communication network 5.

Hardware Configuration:

Hereinafter, a description is given of a hardware configuration of the client terminal 10 and a hardware configuration the server 50 of the first embodiment with reference to FIGS. 2 and 3. It should be noted that the hardware configurations illustrated in FIGS. 2 and 3 may be similar in each embodiment, and the components may be added or deleted as needed.

Hardware Configuration of Client Terminal

Hereinafter, a description is given of a hardware configuration of the client terminal 10 with reference to FIG. 2. FIG. 2 is an example of a hardware block diagram of the client terminal 10 according to the first embodiment. As illustrated in FIG. 2, the client terminal 10 includes, for example, a central processing unit (CPU) 101, a read only memory (ROM) 102, a random access memory (RAM) 103, an electrically erasable programmable read-only memory (EE-PROM) 104, a complementary metal oxide semiconductor (CMOS) sensor 105, an image capture element interface (I/F) 113a, an acceleration/azimuth sensor 106, a media interface (I/F) 108, a global positioning system (GPS) receiver 109, and a graphics processing unit (GPU) 110.

The CPU 101 controls the operation of the client terminal 10 entirely. The ROM 102 stores one or more programs, such as an initial program loader (IPL) used for driving the CPU 101. The RAM 103 is used as a work area of the CPU 101. Under the control of the CPU 101, the EEPROM 104 reads or writes various data, such as programs used for a communication terminal.

The CMOS sensor 105 captures an image of an object (e.g., self-image of user) under the control of the CPU 101 to obtain or acquire image data of the object. The image capture element I/F 113a is a circuit that controls the driving of the CMOS sensor 105. The acceleration/azimuth sensor 106 includes various sensors, such as an electronic magnetic compass that detects geomagnetic magnetism, a gyrocompass, an acceleration sensor, and the like. The media I/F 108 controls data reading and writing (storing) to a recording medium 107, such as a flash memory or the like. The GPS receiver 109 receives GPS signals from GPS satellites. The GPU 110 has a processing function corresponding to application programming interfaces (API), such as Open Graphics Library (OpenGL) to enable high-speed image processing.

Figure 2:
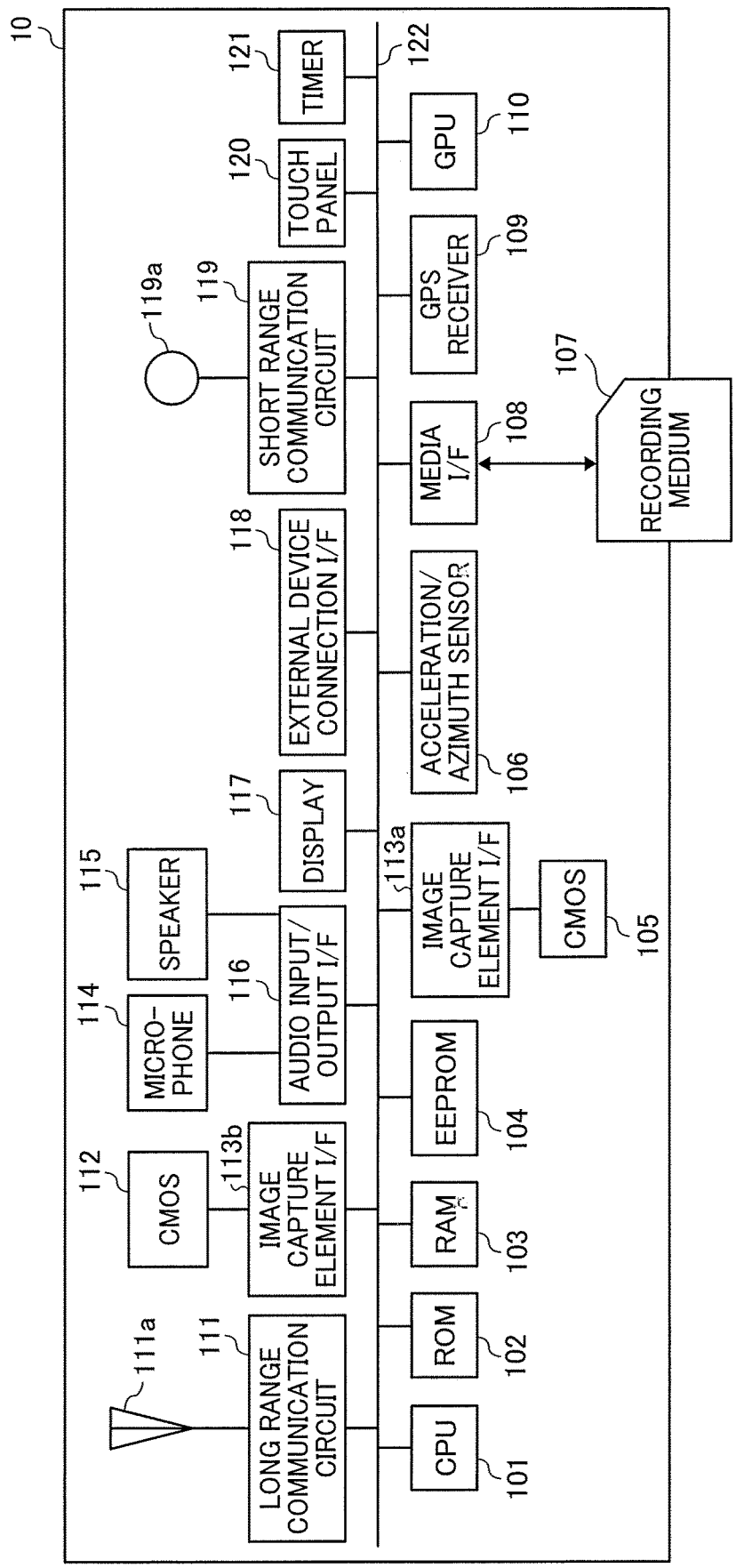
FIG. 2 is an example of a hardware block diagram of a client terminal according to the first embodiment.
Figure 3:
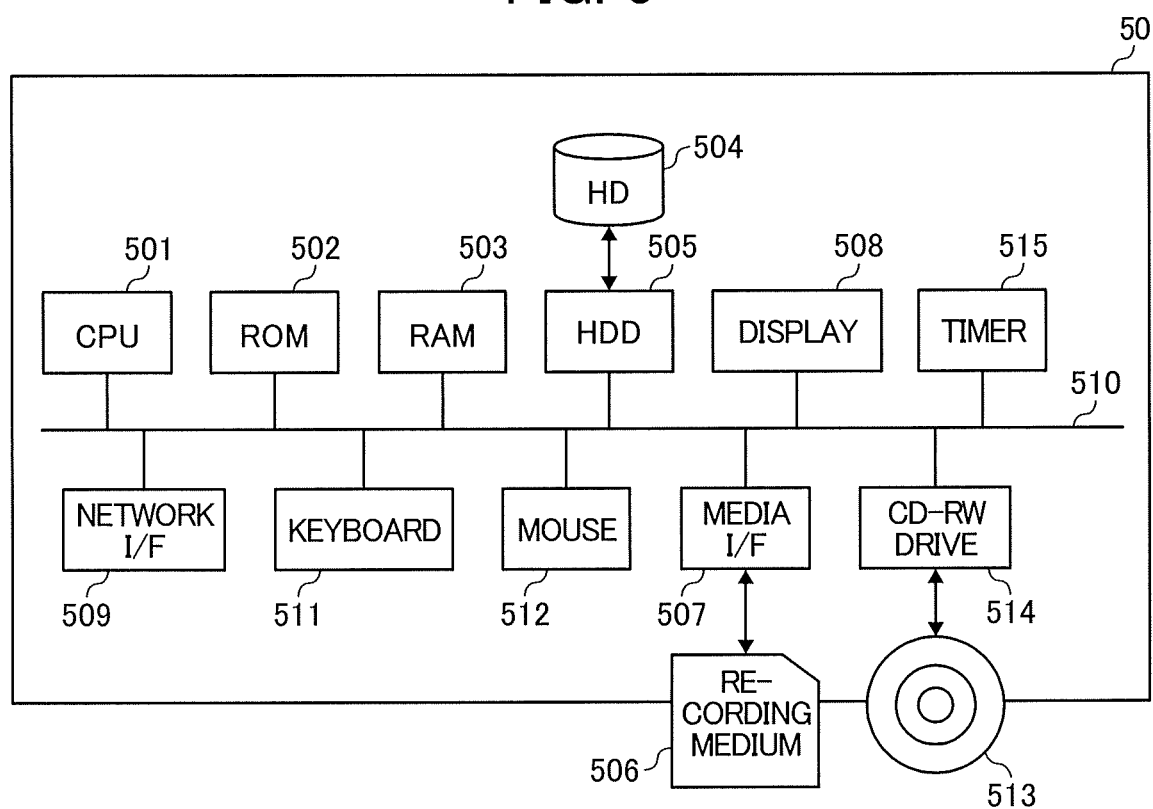
FIG. 3 is an example of hardware block diagram of a server according to the first embodiment.

Further, as illustrated in FIG. 2, the client terminal 10 further includes, for example, a long range communication circuit 111, an antenna 111a, a CMOS sensor 112, an image capture element I/F 113b, a microphone 114, a speaker 115, an audio input/output I/F 116, a display 117, an external device connection I/F 118, a short range communication circuit 119, an antenna 119a of the short range communication circuit 119, a touch panel 120, and a timer 121.

The long range communication circuit 111 is a circuit that communicates with other devices via the communication network 5. The CMOS sensor 112 is a built-in image capture device that captures an image of an object under the control of the CPU 101 to obtain image data of the object. The image capture element I/F 113 is a circuit for controlling the drive of the CMOS sensor 112. The microphone 114 is a built-in audio collecting device for inputting audio. The audio input/output I/F 116 is a circuit that processes an input and output of audio signals with the microphone 114 and the speaker 115 under the control of the CPU 101

The display 117 is a display device, such as a liquid crystal display (LCD) and an organic electro-luminescence (OEL) display, which displays images of objects, various icons, or the like. The external device connection I/F 118 is an interface for connecting the client terminal 10 with various external devices. The short range communication circuit 119 is a communication circuit using, such as Wi-Fi (registered trademark), near field communication (NFC) or Bluetooth (registered trademark). The touch panel 120 is an input device used for operating the client terminal 10 by pressing the display 117. The timer 121 is a measurement device having a time measuring function. The timer 121 can be a computer-implemented software timer.

Further, the client terminal 10 includes, for example, a bus line 122. The bus line 122 includes an address bus and a data bus for electrically connecting each component, such as the CPU 101 and the like.

It should be noted that any of the recording media such as a hard disk (HD) and a compact disk read only memory (CD-ROM) storing programs can be provided as a program product in one country and/or abroad.

Hardware Configuration of Server

Hereinafter, a description is given of a hardware configuration of the server 50 with reference to FIG. 3. FIG. 3 is an example of a hardware block diagram of the server 50 according to the first embodiment.

The server 50 can be constructed using a general computer. As illustrated in FIG. 3, the server 50 includes, for example, a CPU 501, a ROM 502, a RAM 503, a hard disk drive (HDD) 505, a media I/F 507, a display 508, a network I/F 509, a keyboard 511, a mouse 512, a compact disc-rewritable (CD-RW) drive 514, a timer 515, and a bus line 510. Since the server 50 functions as a server, the server 50 may not be equipped with an input device such as the keyboard 511 and the mouse 512, and an output device such as the display 508.

The CPU 501 controls the operation of the server 50 entirely. The ROM 502 stores one or more programs used for driving the CPU 501. The RAM 503 is used as a work area of the CPU 501. The HDD 505 controls reading and writing of various data to the HD 504 under the control of the CPU 501. The HD 504 stores various kinds of data such as programs. The media I/F 507 controls data reading and writing (storing) to a recording medium 506, such as a flash memory or the like.

The display 508 displays various information, such as a cursor, a menu, windows, characters, and images. The network I/F 509 is an interface for performing data communication using the communication network 5. The keyboard 511 is an input device provided with a plurality of keys used for inputting characters, numerals, various instructions, and the like. The mouse 512 is an input device for selecting and executing various instructions, selecting a target of process, moving a cursor, and the like. The CD-RW drive 514 controls reading of various data to the CD-RW 513, which is as an example of a removable recording medium. The timer 515 is a measurement device having a time measuring function. Further, the timer 515 can be a computer-implemented software timer.

Further, the server 50 includes, for example, a bus line 510. The bus line 510 includes an address bus and a data bus for electrically connecting each component, such as the CPU 501 illustrated in FIG. 3.

Functional Configuration

Figure 4:
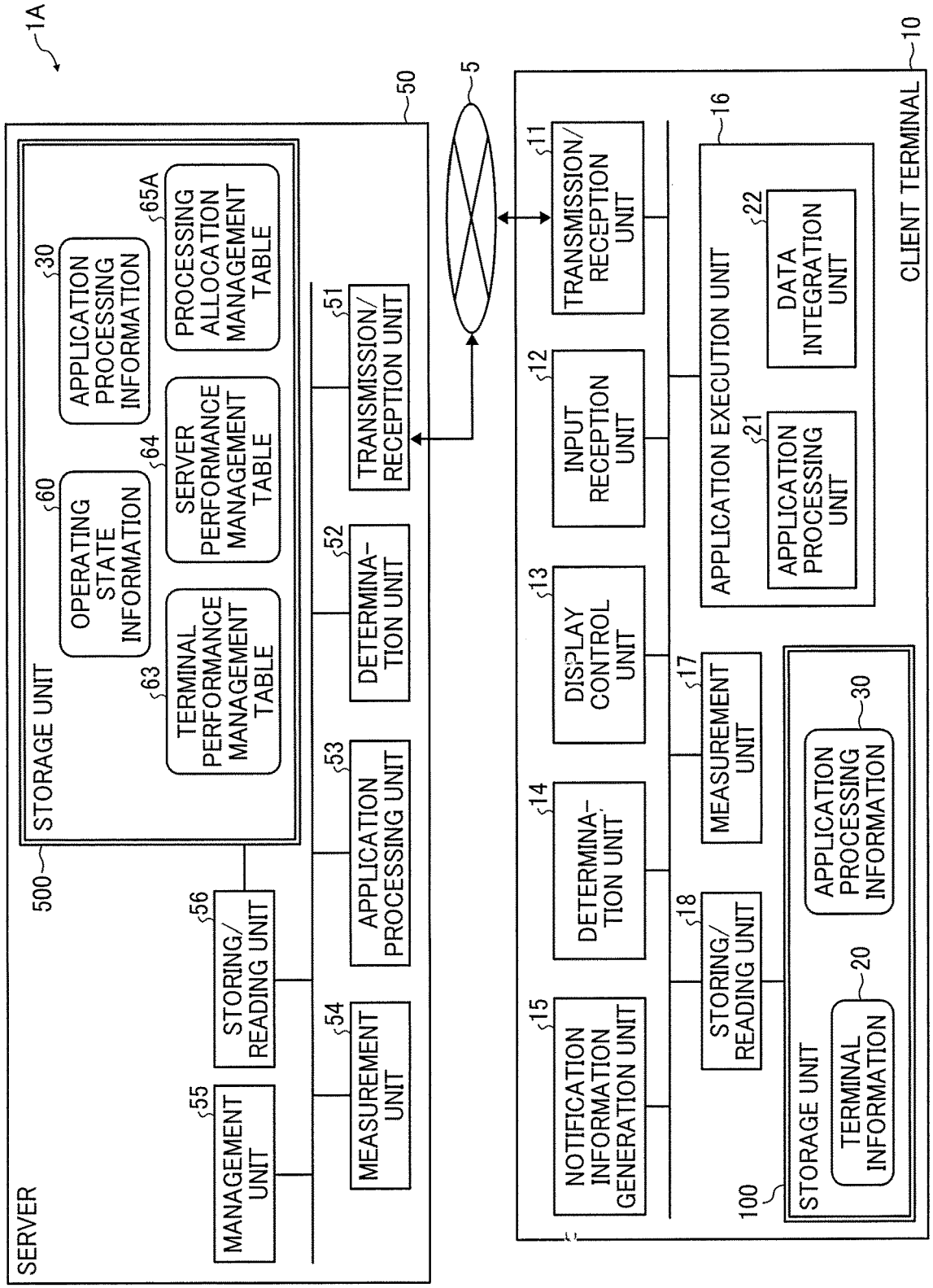
FIG. 4 is an example of a functional block diagram of the information processing system according to the first embodiment.

Hereinafter, a description is given of a functional configuration of the information processing system 1A according to the first embodiment. FIG. 4 is an example of a functional block diagram of the information processing system 1A according to the first embodiment. It should be noted that FIG. 4 illustrates the functional block diagram of the client terminal 10 (one terminal apparatus) and the server 50 (one information processing apparatus), but other client terminal(s) 10 and other server(s) 50 that may configure the information processing system 1A have similar functional configurations.

Functional Configuration of Client Terminal:

Hereinafter, a description is given of a functional configuration of the client terminal 10 with reference to FIG. 4. As illustrated in FIG. 4, the client terminal 10 includes, for example, a transmission/reception unit 11, an input reception unit 12, a display control unit 13, a determination unit 14, a notification information generation unit 15, an application execution unit 16, a measurement unit 17, a storing/reading unit 18, and a storage unit 100.

The transmission/reception unit 11 has a function of transmitting and receiving various data to and from the server 50 via the communication network 5. The transmission/reception unit 11 transmits, for example, notification information 200A including processing request information indicating specific contents of a specific processing requested by a user and terminal information 20 indicating specifications of the client terminal 10 to the server 50. Further, the transmission/reception unit 11 receives, for example, allocation information indicating second processing to be allocated to the client terminal 10 when performing the specific processing indicated in the processing request information from the server 50, in which the allocation information is determined based on the terminal information 20. The transmission/reception unit 11 is mainly implemented by processing of the CPU 101, the long range communication circuit 111 and the antenna 111a illustrated in FIG. 2. The transmission/reception unit 11 is an example of a second transmission unit. Further, the transmission/reception unit 11 is an example of a second reception unit.

The input reception unit 12 has a function of receiving an input operation by a user. The input reception unit 12 receives a request of specific processing, for example, by an input operation by the user. The input reception unit 12 is mainly implemented by the processing of the touch panel 120 and the CPU 101 illustrated in FIG. 2. It should be noted that the touch panel 120 can be integrated with the display 117. Further, the input reception unit 12 can be implemented by an input device other than the touch panel 120.

The display control unit 13 controls displaying of various images on the display 117 of the client terminal 10. The display control unit 13 is mainly implemented by processing of the CPU 101 illustrated in FIG. 2.

The determination unit 14 performs various determinations related to applications installed on the client terminal 10. The determination unit 14 is mainly implemented by processing of the CPU 101 illustrated in FIG. 2.

The notification information generation unit 15 generates or creates the notification information 200A, which is used for notifying process contents of a specific processing request for processing specific image data requested by a user to the server 50. For example, when the input reception unit 12 receives a request of specific processing, the notification information generation unit 15 generates or creates the notification information 200A including specific processing request information indicating the contents of the requested specific processing and the terminal information 20 indicating the specifications of the client terminal 10. The notification information generation unit 15 is mainly implemented by processing of the CPU 101 illustrated in FIG. 2.

The application execution unit 16 has a function for executing one or more applications installed on the client terminal 10. The applications include, for example, an application for performing a specific image processing on image data.

The application performs, for example, facial recognition processing that recognizes a face of a particular person included in image data captured by an image capture device such as a digital camera and a monitoring device. Further, the application detects, for example, a face of a particular person included in image data captured by the image capture device and then performs a blurring process that blurs faces other than the detected face of the particular person. Further, the application identifies, for example, a position or location where image data is captured based on a person or a building included in the image data captured by the image capture device. It should be noted that the processing performed by the application is not limited thereto. Further, the client terminal 10 can be configured to perform a plurality of processing using one application. Further, the application can be acquired from one or more web servers, which provide various applications (contents), connected to the client terminal 10 via the communication network 5, and the acquired application is installed on the client terminal 10.

The application execution unit 16 includes, for example, an application processing unit 21 and a data integration unit 22. The application processing unit 21 has a function for performing one or more specific processing requested by a user on the application. For example, the application processing unit 21 performs processing allocated to the client terminal 10 in accordance with allocation information of the processing on process target data, transmitted from the server 50. The application processing unit 21 is implemented mainly by one or more programs executed by the CPU 101 illustrated in FIG. 2. The application processing unit 21 is an example of a second processing unit.

The data integration unit 22 integrates a result of the processing (second processing) performed by the client terminal 10 and a result of the processing (first processing) performed by the server 50 to generate process-result data, which is a result obtained for the requested specific processing. The data integration unit 22 is mainly implemented by one or more programs executed by the CPU 101 illustrated in FIG. 2. The data integration unit 22 is an example of a generation unit.

The measurement unit 17 measures a time period that is required for performing the second processing in the application processing unit 21. The measurement unit 17 is mainly implemented by the CPU 101 and the timer 121 illustrated in FIG. 2.

The storing/reading unit 18 stores various data in the storage unit 100 and reads various data from the storage unit 100. The storing/reading unit 18 is mainly implemented by the processing of the CPU 101 illustrated in FIG. 2. The storage unit 100 is mainly implemented by the ROM 102, the EEPROM 104, and the recording medium 107 illustrated in FIG. 2. The storage unit 100 stores, for example, the terminal information 20 and application processing information 30.

Terminal Information:

Hereinafter, a description is given of example of data stored in the storage unit 100. FIG. 5 is an example of the terminal information 20 associated with the client terminal 10 according to the first embodiment. The terminal information 20 includes information indicating specifications (specification values) of computer resources (items) of the client terminal 10. The terminal information 20 includes information that is uniquely defined for each computer resource (item) of the client terminal 10.

In an example case in FIG. 5, the terminal information 20 includes information indicating specifications of the client terminal 10, such as the type of CPU is SnapDragon 845, the memory capacity of RAM is 4 giga byte (GB), and the type of GPU is Adreno 530. The specifications (specification values) corresponding to "items" included in the terminal information 20 are not limited thereto. For example, the information of the specification (specification value) of each item can be the number of cores and operating frequency in a case of CPU, operation frequency and transfer rate in a case of RAM, and presence/non-presence, core clock, memory clock, and capacity of voltage regulator module (VRM) in a case of GPU.

Although the first embodiment describes an example case in which the client terminal 10 transmits the terminal information 20 together with specific image data and specific processing request information indicating a processing request for the specific image data, the terminal information 20 can be stored in the server 50 in advance. In this case, the server 50 stores the terminal information 20 set for each of the client terminals 10 in advance. Further, the terminal information 20 can include not only the information indicating specifications (specification values) of the client terminal 10 but also information indicating an operating state of the computer resource of the client terminal 10.

Application Processing Information

FIG. 6 is an example of application processing information according to the first embodiment. In an example case in FIG. 6, the application processing information 30 is information used for image processing corresponding to each application installed on the client terminal 10. In an example case in FIG. 6, the application processing information 30 includes information to be used for image processing corresponding to an application, such as a process of matching a face (face matching process) of a person included in the to-be-processed image data (process target data).

As illustrated in FIG. 6, the application processing information 30 stores one or more feature values and one or more registration names in association with each other. In an example case in FIG. 6, the feature value indicates a feature value for identifying a face of a person included in image data. The registration name is identification information for identifying each feature value. The identification information is, for example, a name and/or a symbol registered in advance.

It should be noted that the client terminal 10 can store the application processing information 30 that is unique to each image processing performed by each application. Further, the image processing performed by the application can include processing that is performed without using the application processing information 30.

Functional Configuration of Server:

Hereinafter, a description is given of a functional configuration of the server 50 with reference to FIG. 4. As illustrated in FIG. 4, the functions implemented by the server 50 include, for example, a transmission/reception unit 51, a determination unit 52, an application processing unit 53, a measurement unit 54, a management unit 55, a storing/reading unit 56, and a storage unit 500.

The transmission/reception unit 51 has a function of transmitting and receiving various data to and from the client terminal 10 via the communication network 5. The transmission/reception unit 51 receives, for example, the notification information 200A transmitted from the client terminal 10. Further, the transmission/reception unit 51 transmits, for example, allocation information indicating the processing (second processing) to be allocated to the client terminal 10, which is determined by the determination unit 52, to the client terminal 10. Further, the transmission/reception unit 51 transmits a first result of the first processing performed by the application processing unit 53 to the client terminal 10. The transmission/reception unit 51 is implemented by, for example, the network OF 509 and a program executed by the CPU 501 illustrated in FIG. 3. The transmission/reception unit 51 is an example of a first reception unit. The transmission/reception unit 51 is an example of a first transmission unit.

The determination unit 52 determines the allocation of processing for performing the specific processing between the client terminal 10 and the server 50 for the specific processing (e.g., specific image processing) indicated by the processing request information transmitted from the client terminal 10. Specifically, based on the terminal information 20, the determination unit 52 determines an allocation of processing for performing the requested specific processing indicated by the processing request information by allocating the second processing to the client terminal 10 and the first processing to the server 50, in which a combination of the first processing and the first processing constitute the requested specific processing indicated by the processing request information. The determination unit 52 is mainly implemented by processing of the CPU 501 illustrated in FIG. 3. The determination unit 52 is an example of a determination unit.

The application processing unit 53 performs the first processing, allocated to the server 50 by the determination unit 52. The application processing unit 53 is implemented mainly by a program executed by the CPU 501 illustrated in FIG. 3. The application processing unit 53 is an example of a first processing unit.

The measurement unit 54 measures a time period that is required for performing the first processing by the application processing unit 53. The measurement unit 54 is implemented mainly by the timer 515 and a program executed by the CPU 501 illustrated in FIG. 3.

The management unit 55 has a function of managing various types of data stored in the storage unit 500. For example, the management unit 55 generates or creates, and updates a processing allocation management table 65A stored in the storage unit 500. Further, for example, the management unit 55 monitors an operating state of the server 50 regularly or periodically to generate or create and update operating state information 60. Further, the management unit 55 generates or creates the application processing information 30 to be used for image processing to be performed by the server 50. The management unit 55 is mainly implemented by processing of the CPU 501 illustrated in FIG. 3. The management unit 55 is an example of an update unit.

The storing/reading unit 56 stores various data in the storage unit 500 and reads various data from the storage unit 500. The storing/reading unit 56 is mainly implemented by processing of the CPU 501 illustrated in FIG. 3. The storage unit 500 is mainly implemented by the ROM 502, the HD 504, the recording medium 506, and the CD-RW 513 illustrated in FIG. 3. The storage unit 500 is an example of a storage unit. Further, the storage unit 500 stores the application processing information 30, the operating state information 60, a terminal performance management table 63, a server performance management table 64, and a processing allocation management table 65A. Since the application processing information 30 is similar to the application processing information stored in the storage unit 100 of the client terminal 10, the description thereof will be omitted.

State Information of Server:

Hereinafter, a description is given of example of data stored in the storage unit 500. At first, with reference to FIG. 7, the operating state information 60 of the server 50 is described. FIG. 7 is an example of the operating state information 60 of the server 50 according to the first embodiment. The operating state information 60 includes information indicating the operating state of computer resources of the server 50. The operating state information 60 can be updated constantly or periodically by the management unit 55. In an example case in FIG. 7, the operating state information 60 includes information of items of the server 50, such as utilization rate of CPU, utilization level of memory, utilization level of storage, remaining amount of power source (battery), and the number of connected client terminals using Socket communication of the server 50. It should be noted that the information of items included in the operating state information 60 are not limited thereto.

In an example case in FIG. 7, the operating state information 60 indicates that the utilization rate of CPU is 40%, and 32 GB of the memory having 64 GB capacity is used in the server 50. Further, in an example case in FIG. 7, the operating state information 60 indicates that 1.4 tera byte (TB) of the storage having 16 TB capacity is used and the remaining power of power source (battery) of the uninterruptible power source is 80% in the server 50. Further, in an example case in FIG. 7, the operating state information 60 indicates that three client terminals 10 are connected to the server 50.

Terminal Performance Management Table:

Hereinafter, a description is given of the terminal performance management table 63 with reference to FIG. 8. FIG. 8 is an example of the terminal performance management table 63 according to the first embodiment. The terminal performance management table 63 is used to determine the performance of the client terminal 10. In an example case in FIG. 8, the terminal performance management table 63 stores "condition" used for determining the performance of the client terminal 10 and each of the "items" related to the computer resources of the client terminal 10 in association with each other. The performance of the client terminal 10 may mean the performance level of the computer resources of the client terminal 10.

The "item" is information indicating a general-purpose computer resource. In an example case in FIG. 8, the "item" includes CPU, RAM, GPU, and the like. Further, the "item" may include storage capacity, type of power source, version of operating system (OS), and the like. It should be noted that "item" of the terminal performance management table 63 preferably include the "item" included in the terminal information 20 illustrated in FIG. 5 as common contents.

The "condition" is a condition for determining the performance of the client terminal 10. The information set in "condition" is a determination criterion corresponding to the specification information included in the terminal information 20 illustrated in FIG. 5. In an example case in FIG. 8, the "condition" includes a condition that the type of CPU is Snapdragon 845. Further, in an example case in FIG. 8, the "condition" includes a condition that the capacity of the RAM is 4 GB or more. Further, in an example case in FIG. 8, the "condition" includes a condition that the type of GPU is Adreno 540.

Further, similar to the terminal information 20 illustrated in FIG. 5, the information set in "condition" can be determination criterion, such as number of cores and operating frequency in a case of CPU, operation frequency and transfer rate in a case of RAM, and presence/non-presence, core clock, memory clock, and capacity of voltage regulator module (VRM) in a case of GPU.

For example, if at least one of the specifications (specification values) of each item included in the terminal information 20 (FIG. 5) satisfies the "condition" included in the terminal performance management table 63 (FIG. 8), the determination unit 52 determines that the performance of the client terminal 10 is "high." On the other hand, for example, if none of the specifications (specification values) of each item included in the terminal information 20 (FIG. 5) satisfies the "condition" included in the terminal performance management table 63 (FIG. 8), the determination unit 52 determines that the performance of the client terminal 10 is "low" or "normal."

Further, the number of items satisfying "condition" used for determining that the performance of the client terminal 10 is "high" is not limited to one but can be appropriately changed from one to many. Further, the determination unit 52 can restrict the "item" used for determining the performance of the client terminal 10 in accordance with a type of to-be-processed image data (i.e., process target data) and a type of requested image processing.

Server Performance Management Table:

Hereinafter, a description is given of the server performance management table 64 with reference to FIG. 9. FIG. 9 is an example of the server performance management table 64 according to the first embodiment. The server performance management table 64 is used to determine the performance of the server 50. In an example case in FIG. 9, the server performance management table 64 stores "condition" used for determining the performance of the server 50 and each of the "items" related to the computer resources of the server 50 in association with each other. The performance of the server 50 may mean the performance level of the computer resources of the server 50.

The "item" is information indicating a general-purpose computer resource. In an example case in FIG. 9, the "item" includes CPU, memory, storage, power source (battery), and the number of connected client terminals using the Socket communication. It should be noted that "item" of the server performance management table 64 preferably include "item" included in the operating state information 60 illustrated in FIG. 7 as common contents.

The "condition" is a condition for determining the performance of the server 50. The information set in "condition" is a determination criterion corresponding to the information of the operating state included in the operating state information 60 illustrated in FIG. 7. In an example case in FIG. 9, the "condition" includes a condition that the utilization rate of CPU exceeds 80%. Further, in an example case in FIG. 9, the "condition" includes a condition that the amount of use of the memory capacity exceeds 16 GB. Further, in an example case in FIG. 9, the "condition" includes a condition that the amount of use of the storage capacity exceeds 1.8 TB. Further, in an example case in FIG. 9, the "condition" includes a condition that the remaining amount of power source of the uninterruptible power source unit is 10% or less. Further, in an example case in FIG. 9, the "condition" includes a condition that the number of the client terminals 10 connected to the server 50 is more than five.

For example, if at least one of the operating states of each item included in the operating state information 60 (FIG. 7) satisfies the "condition" included in the server performance management table 64 (FIG. 9), the determination unit 52 determines that the performance of the server 50 is "low" or "normal." On the other hand, for example, if none of the operating state of each item included in the operating state information 60 (FIG. 7) satisfies the "condition" included in the server performance management table 64 (FIG. 9), the determination unit 52 determines that the performance of the server 50 is "high."

Further, the number of items satisfying "condition" used for determining that the performance of the server 50 is "low" is not limited to one but can be appropriately changed from one to many. Further, the determination unit 52 can restrict the "item" used for determining the performance of the server 50 in accordance with a type of to-be-processed image data (i.e., process target data) and a type of requested image processing.

Processing Allocation Management Table:

Hereinafter, a description is given of the processing allocation management table 65A with reference to FIG. 10. FIGS. 10A and 10B (FIG. 10) are examples of the processing allocation management table 65A according to the first embodiment. In an example case in FIG. 10, the processing allocation management table 65A is used to determine the allocation of processing for performing the specific processing requested by a user between the client terminal 10 and the server 50. The processing allocation management table 65A is an example of management information.

The server 50 stores the processing allocation management table 65A, which is prepared differently for each one of the servers 50 based on the performance of the servers 50. FIG. 10A is an example of the processing allocation management table 65Aa that is used when the performance of the server 50 is "high." FIG. 10B is an example of the processing allocation management table 65Ab that is used when the performance of the server 50 is "normal" or "low." The performance of the server 50 can be determined by the determination unit 52 by comparing the operating state information 60 (FIG. 7) and the server performance management table 64 (FIG. 9).

In an example case in FIG. 10A, the processing allocation management table 65Aa stores processing information and allocation ratio in association with each other. In an example case in FIG. 10A, the processing information includes process name, process contents, and information of task set as an allocation target (allocation target task). Further, the process contents are similar for the processing allocation management table 65Aa (FIG. 10A) and the processing allocation management table 65Ab (FIG. 10B). Further, the process contents included in the processing request information correspond to the contents of specific processing information included in the processing allocation management table 65Aa and the processing allocation management table 65Ab.

The process name is a name of processing requested by a user. In an example case in FIG. 10A, the process name includes "blur processing" and "position identification processing." For example, the "blur processing" is a process for detecting a face of a particular person included in to-be-processed image data (i.e., process target data) and then blurring one or more faces other than the detected face of the particular person. The "position identification processing" is a process for identifying a position or location where image data is captured based on a person or a building included in the to-be-processed image data (i.e., process target data). Further, the specific processing requested by the user is not limited thereto, but the processing that can be performed by the application of the server 50 can be pre-set in the processing allocation management table 65A.

The process contents indicate contents of one or more tasks to be performed when the requested specific processing is to be performed. For example, the processing requested by the user may be divided into a plurality of tasks, and a process result of the requested specific processing is generated by processing the plurality of tasks step by step.

In an example case in FIG. 10, the "blur processing" includes three steps such as a task 1 of "facial detection (facial detection processing)," a task 2 of "matching detected face (face matching processing)" and a task 3 of "face blurring (face blur processing)." In an example case in FIG. 10, the "position identification processing" includes two steps such as a task 1 of "detection of specific target" and a task 2 of "position detection."

The allocation target task indicates a task that can be allocated to the client terminal 10 and the server 50 among the plurality of tasks indicated by the process contents. In this description, the allocation target task indicates the task that can be performed at the client terminal 10 and the server 50 in parallel or concurrently.

In a case of "blur processing" in FIG. 10, the allocation target task is, for example, the task 2 of "matching detected face (face matching processing)." As to the task 2 of "matching detected face (face matching processing)," the determination unit 52 assigns face information to the client terminal 10 and the server 50, each of which performs the face matching process for the information of one or more detected faces. Then, the data integration unit 22 integrates results of the processing respectively performed by the client terminal 10 and the server 50. Therefore, as to the task 2 of "matching detected face (face matching processing)," the second processing is performed at the client terminal 10 and the first processing is performed at the server 50 independently, and then a second result of the second processing performed by the client terminal 10 and a first result of the first processing performed by the server 50 are integrated, in which the specific processing requested by a user can be performed in parallel or concurrently at the client terminal 10 and the server 50. Further, the "position identification processing" illustrated in FIG. 10 includes, for example, the task 1 of "detection of specific object."

The allocation ratio is a ratio of the processing to be allocated to the client terminal 10 and the server 50 for the allocation target task. Based on the performance of the client terminal 10 and the performance of the server 50, different allocation ratios are set even if the same processing is to be performed.

In an example case in FIG. 10A, if the processing allocation management table 65Aa is applied when the performance of the server 50 is high and the performance of the client terminal 10 is high and the task 2 of the "blur processing," which is the allocation target task, is to be performed, the allocation ratio of processing for performing the task 2 becomes 75% for the client terminal 10 and 25% for the server 50. Further, when the performance of the server 50 is high and the performance of the client terminal 10 is low or normal and the task 2 of the "blur processing", which is the allocation target task, is to be performed, the allocation ratio of processing for performing the task 2 becomes 30% for the client terminal 10 and 70% for the server 50.

Further, in an example case in FIG. 10B, if the processing allocation management table 65Ab is applied when the performance of the server 50 is low or normal and the performance of the client terminal 10 is high and the task 2 of the "blur processing," which is the allocation target task, is to be performed, the allocation ratio of processing for performing the task 2 becomes 90% for the client terminal 10 and 10% for the server 50. Further, when the performance of the server 50 is low or normal and the performance of the client terminal 10 is high and the task 2 of the "blur processing," which is the allocation target task, is to be performed, the allocation ratio of processing for performing the task 2 becomes 50% for the client terminal 10 and 50% for the server 50.

Further, the allocation ratio is an example of the allocation of processing for performing the specific processing between the client terminal 10 and the server 50. In FIG. 10, the allocation ratio indicates the percentage (%) of processing allocated to the client terminal 10 and the server 50, but the allocation ratio can be defined by the number of processes allocated to the client terminal 10 and the server 50.

Further the classification of the performance of the client terminal 10 included in the processing allocation management table 65A is not limited to "high" and "low (low or normal)" but can be three or more classifications. In this case, the server 50 sets a plurality of conditions (threshold values) in a stepwise manner in the terminal performance management table 63 to determine the performance of the client terminal 10. Similarly, the classification of the performance the server 50 is not limited to "high" and "low (low or normal) but can be three or more classifications. In this case, the server 50 sets a plurality of conditions (threshold values) in a stepwise manner in the server performance management table 64 to determine the performance of the server 50.

Processing/Operation in First Embodiment

Figure 11:
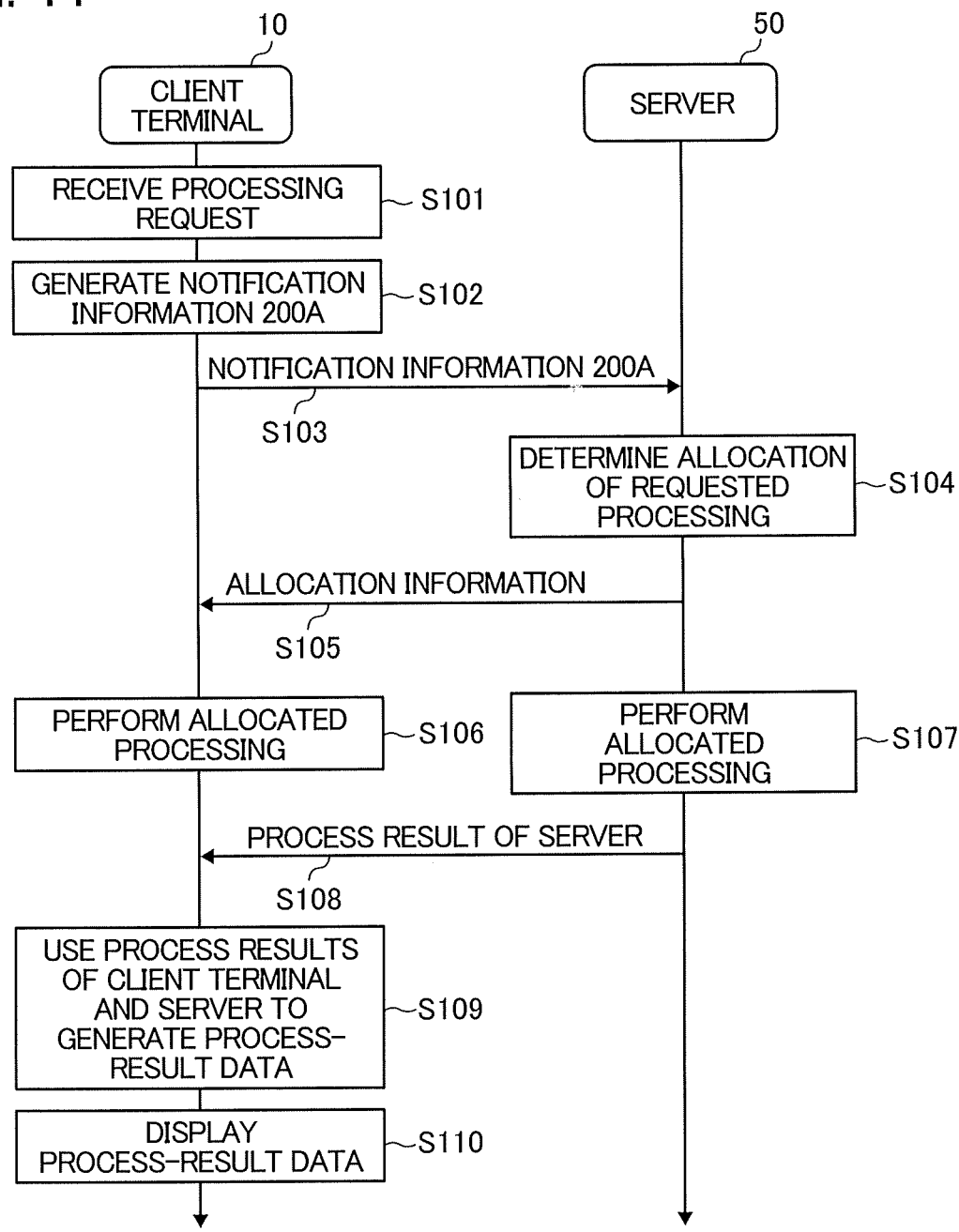
FIG. 11 is an example of a sequence diagram illustrating a method of processing information in the information processing system according to the first embodiment.

Hereinafter, a description is given of processing and operation in the information processing system 1A according to the first embodiment with reference to FIG. 11. FIG. 11 is an example of a sequence diagram illustrating a method of processing information in the information processing system 1A according to the first embodiment. FIG. 11 illustrates an example case that a blur processing of faces other than a particular person included in image data is requested. It should be noted that the type of image processing performed in the information processing system 1A is not limited thereto.

In step S101, the input reception unit 12 of the client terminal 10 receives a processing request of specific image data input by a user operation. Specifically, the input reception unit 12 receives an image processing request for the specific image data when the user operates a menu, corresponding to an application, displayed on the display 117 under the control of the display control unit 13.

In step S102, when the input reception unit 12 receives the processing request, the notification information generation unit 15 of the client terminal 10 creates or generates the notification information 200A to be transmitted to the server 50. Specifically, at first, the notification information generation unit 15 acquires the terminal information 20 stored in the storage unit 100. Then, the notification information generation unit 15 outputs a read request of the terminal information 20 to the storing/reading unit 18. When the storing/reading unit 18 detects the read request of the terminal information 20, the storing/reading unit 18 reads out the terminal information 20 stored in the storage unit 100. Then, the storing/reading unit 18 outputs the read terminal information 20 to the notification information generation unit 15.

Figure 12:
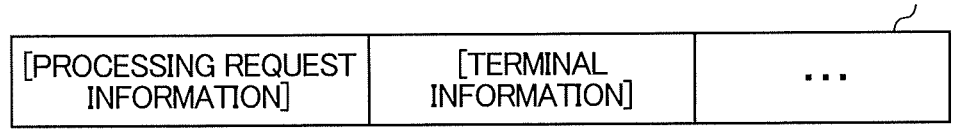
FIG. 12 is an example of a configuration of contents of notification information according to the first embodiment.

Then, the notification information generation unit 15 creates or generates the notification information 200A including the processing request information indicating the contents of the requested specific processing and the read terminal information 20. FIG. 12 is an example of a configuration of the contents of the notification information 200A according to the first embodiment. As illustrated in FIG. 12, the notification information 200A includes information, such as "processing request information" and "terminal information."

The "processing request information" is information that identifies the contents of the specific processing requested by the user. The processing request information includes, for example, identification information of the specific processing, such as a name of processing and/or identification ID set to the specific processing.

The "terminal information" is information including specifications (specification values) of the client terminal 10, such as the contents of the terminal information 20 illustrated in FIG. 5. Further, the terminal information can include identification information identifying the client terminal 10.

In step S103, the transmission/reception unit 11 of the client terminal 10 transmits the notification information 200A to the server 50 (transmission step). Further, the transmission/reception unit 11 transmits the to-be-processed image data (image information) to the server 50 together with the notification information 200A. With this configuration, the client terminal 10 can provide the contents of the specific processing requested by the user and the information indicating the specifications (specification values) of the client terminal 10 to the server 50.

Figure 13:
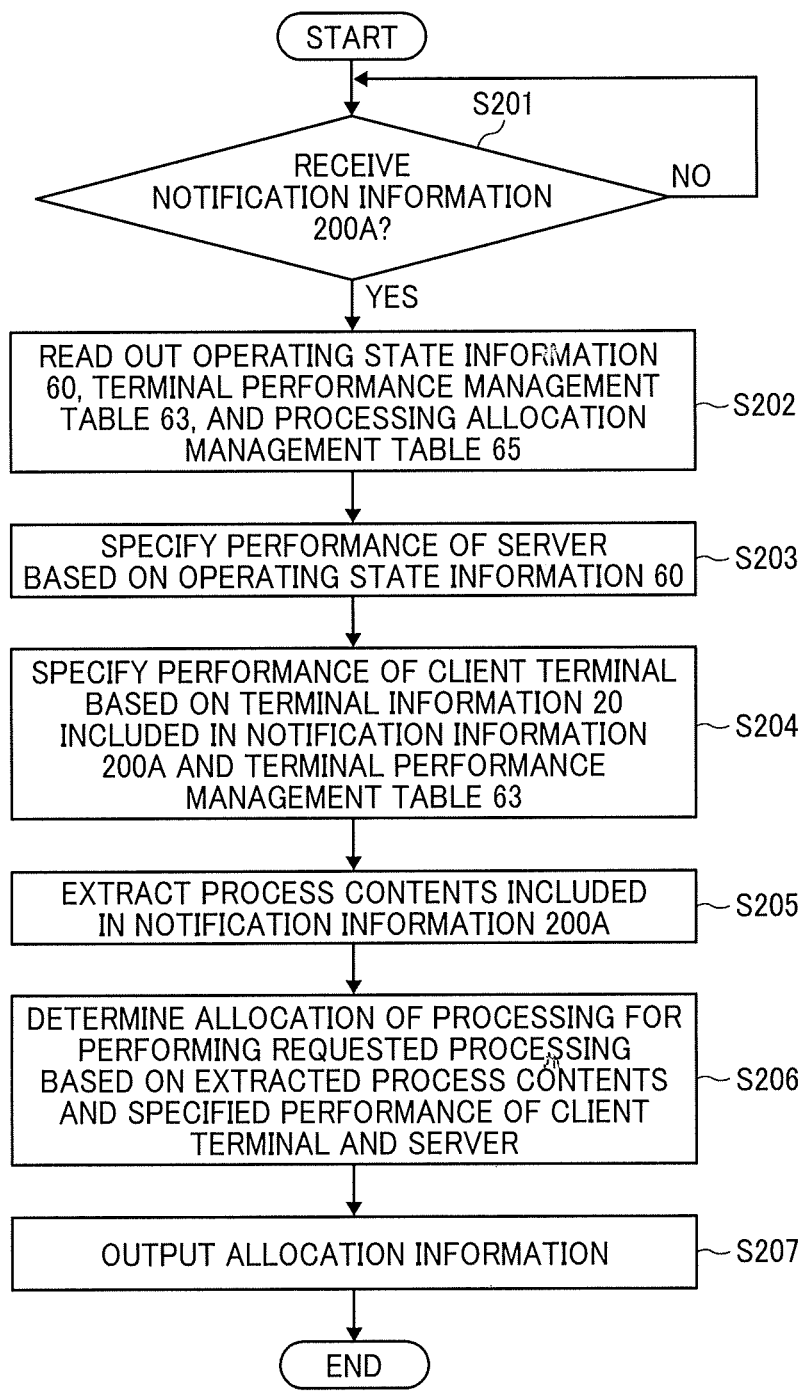
FIG. 13 is an example of a flow chart illustrating the steps of determining allocation of processing for performing a specific processing in the server according to the first embodiment.

In step S104, when the determination unit 52 of the server 50 receives the notification information 200A via the transmission/reception unit 51, the determination unit 52 determines the allocation of processing for performing the requested specific processing. Hereinafter, a description is given of a process of allocating processing for performing the requested specific processing between the client terminal 10 and the server 50, which is performed in the server 50, with reference to FIGS. 13 and 14. FIG. 13 is an example of a flow chart illustrating the steps of determining the allocation of processing for performing the requested specific processing, which is performed in the server 50 according to the first embodiment.

In step S201 the transmission/reception unit 51 checks whether the server 50 receives the notification information 200A. In response to receiving the notification information 200A (step S201: YES), the transmission/reception unit 51 proceeds the sequence to step S202. The server 50 repeats step S201 until the transmission/reception unit 51 receives the notification information 200A (step S201: NO).

In step S202, the determination unit 52 reads out the operating state information 60, the terminal performance management table 63, and the processing allocation management table 65 from the storage unit 500. Specifically, the determination unit 52 outputs a read request of the operating state information 60, the terminal performance management table 63, the server performance management table 64, and the processing allocation management table 65 to the storing/reading unit 56. When the storing/reading unit 56 detects the read request output from the determination unit 52, the storing/reading unit 56 reads out the operating state information 60, the terminal performance management table 63, the server performance management table 64, and the processing allocation management table 65 stored in the storage unit 500. Then, the storing/reading unit 56 outputs the read operating state information 60, the terminal performance management table 63, the server performance management table 64 and the processing allocation management table 65 to the determination unit 52.

In step S203, the determination unit 52 specifies or determines the performance of the server 50 based on the read operating state information 60. Specifically, if at least one of the operating states of the items included in the operating state information 60 (FIG. 7) satisfies the "condition" included in the server performance management table 64 (FIG. 9), the determination unit 52 determines that the performance of the server 50 is "low" or "normal." On the other hand, if none of the operating states of the items included in the operating state information 60 (FIG. 7) satisfies the "condition" included in the server performance management table 64 (FIG. 9), the determination unit 52 determines that the performance of the server 50 is high.

If the operating state of the server 50 is in the state indicated by the operating state information 60 illustrated in FIG. 7 and the determination unit 52 determines the performance of the server 50 using the server performance management table 64 illustrated in FIG. 9, the determination unit 52 determines that the performance of the server 50 is "high" because none of the operating states of the items included in the operating state information 60 (FIG. 7) satisfies the "condition" included in the server performance management table 64 (FIG. 9).

Further, the number of items satisfying "condition" used for determining that the performance of the server 50 is "low" is not limited to one but can be appropriately changed from one to many. Further, the determination unit 52 can restrict the "item" used for determining the performance of the server 50 in accordance with a type of to-be-processed image data (i.e., process target data) and a type of requested image processing.

Then, in step S204, the determination unit 52 specifies or determines the performance of the client terminal 10 based on the terminal information 20 (FIG. 5) included in the notification information 200A received by the transmission/reception unit 51, and the read terminal performance management table 63 (FIG. 8).

Specifically, if at least one of the specifications of items included in the terminal information 20 (FIG. 5) satisfies the "condition" included in the terminal performance management table 63 (FIG. 8), the determination unit 52 determines that the performance of the client terminal 10 is "high." On the other hand, if none of the specifications of items included in the terminal information 20 (FIG. 5) satisfies the "condition" included in the terminal performance management table 63 (FIG. 8), the determination unit 52 determines that the performance of the client terminal 10 is "low" or "normal."

If the specification of items of the client terminal 10 is in a state indicated by the terminal information 20 illustrated in FIG. 5 and the determination unit 52 determines the performance of the client terminal 10 using the terminal performance management table 63 illustrated in FIG. 8, the determination unit 52 determines that the performance of the client terminal 10 is "high" because the specifications of the CPU and the RAM defined in the terminal information 20 satisfy the "condition" of the terminal performance management table 63.

Further, the number of items satisfying the "condition" used for determining that the performance of the client terminal 10 is "high" is not limited to one but can be appropriately changed from one to many. Further, the determination unit 52 can restrict the "item" used for determining the performance of the client terminal 10 in accordance with a type of to-be-processed image data (i.e., process target data) and a type of requested image processing.

In step S205, the determination unit 52 extracts the process contents included in the notification information 200A received by the transmission/reception unit 51. Specifically, the determination unit 52 extracts the processing information of "blur processing" as the process contents included in the notification information 200A illustrated in FIG. 12.

In step S206, the determination unit 52 determines the allocation of processing for performing the specific processing requested by the client terminal 10 based on the process contents extracted from the notification information 200A and the specified performance of the client terminal 10 and the specified performance of the server 50.

Figure 14:
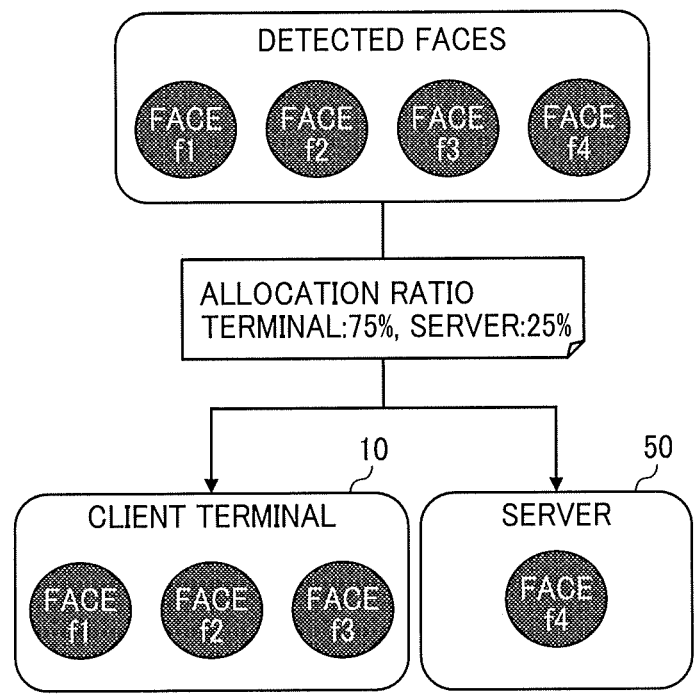
FIG. 14 is an example of a diagram of describing an allocation of processing for performing processing between the client terminal and the server according to the first embodiment.

Hereinafter, a description is given of an example of a process of determining the allocation of processing for performing the specific processing in the server 50. FIG. 14 is an example of a diagram of describing an allocation for the specific processing between the client terminal 10 and the server 50 according to the first embodiment.

As described above, the specific processing requested by the user in the first embodiment is "blur processing" for the specific image data. The "blur processing" is a process for blurring faces of persons other than a particular person, and the "blur processing" includes three steps of tasks 1 to 3. For example, the task 2, which is the allocation target task, is a process for matching the face detected by the task 1 (face detection processing) using the client terminal 10 and server 50 that use the application processing information 30 illustrated in FIG. 7. In this case, as illustrated in FIG. 14, it is assumed that four faces are detected from the process target image data by performing the task 1 (face detection process).

If the performance of the client terminal 10 is high and the performance of the server 50 is high, the determination unit 52 extracts the allocation ratio associated with the item of the terminal performance of "high" for the "blur processing" included in the processing allocation management table 65Aa illustrated in FIG. 10A, in which the extracted allocation ratio of processing for performing the task 2 is 75% for the client terminal 10 and 25% for the server 50. Therefore, the determination unit 52 allocates the matching process of three faces to the client terminal 10 among four faces detected in task 1 (face detection process) and allocates the matching process of one face to the server 50.

In this case, as to the task 2 (face matching processing) set as the allocation target task, the determination unit 52 allocates a part of the face information of the plurality of faces (e.g., faces 1 to 4) detected by the task 1 (face detection process) to the client terminal 10, which is to perform the second processing, and a remaining part of the face information of the plurality of faces (e.g., faces 1 to 4) detected by the task 1 (face detection process) to the server 50, which is to perform the first processing. Then, the data integration unit 22 integrates the second result of the second processing performed by the client terminal 10 and the first result of the first processing performed by the server 50. Therefore, the specific processing of task 2 (face matching processing) is divided into the second processing and the first processing performed independently at the client terminal 10 and the server 50, and then the second result of the second processing performed by the client terminal 10 and the first result of the first processing performed by the server 50 are integrated, in which the specific processing can be performed in parallel or concurrently at the client terminal 10 and the server 50.

In step S207, the determination unit 52 outputs allocation information (assignment information) including the allocated contents indicating the determined allocation ratio of the processing to the transmission/reception unit 51. Then, the transmission/reception unit 51 transmits the allocation information output from the determination unit 52 to the client terminal 10. With this configuration, the server 50 can allocate the second processing to be performed at the client terminal 10 and the first processing to be performed at the server 50 for generating the process-result data, which is a process result for the requested specific processing, in accordance with processing capabilities of the client terminal 10 and processing capabilities of the server 50.

Referring back to FIG. 11, the information processing method in the information processing system 1A is further described.

In step S105 the transmission/reception unit 51 of the server 50 transmits the allocation information including the allocation contents determined by the determination unit 52 to the client terminal 10. In a case of the allocation result illustrated in FIG. 14, the transmission/reception unit 11 transmits the information on allocating the matching processing of face f1 to face f3 to the client terminal 10.

The allocation information may include the information of the second processing allocated to the client terminal 10 alone, or the information of the second processing allocated to the client terminal 10 and the first processing allocated to the server 50 respectively. The transmission/reception unit 11 of the client terminal 10 receives the allocation information transmitted from the server 50 (receiving step).

Further, when the transmission/reception unit 11 receives the allocation information, the transmission/reception unit 11 of the client terminal 10 can transmit the to-be-processed image data (image information) to the server 50. In this case, the transmission/reception unit 11 does not transmit the to-be-processed image data (image information) to the server 50 in step S103 in FIG. 11, but the transmission/reception unit 11 transmits the to-be-processed image data (image information) to the server 50 after receiving the allocation information from the server 50 in step S105. It should be noted that the transmission timing of the to-be-processed image data (image information) from the client terminal 10 to the server 50 can be any timing described as above.

In response to receiving the allocation information (assignment information) by the transmission/reception unit 11, in step S106, the application processing unit 21 of the client terminal 10 performs the second processing allocated to the client terminal 10 (processing step). For example, the application processing unit 21 uses the application processing information 30 stored in the storage unit 100 to perform the matching processing of the face f1 to face f3 included in the image data, which is the process target data illustrated in FIG. 14.

In step S107, the application processing unit 53 of the server 50 performs the first processing allocated to the server 50 by the determination unit 52. For example, the application processing unit 53 uses the application processing information 30 stored in the storage unit 500 to perform the matching processing of the face f4 included in the image data, which is the process target data illustrated in FIG. 14.

In step S108 the transmission/reception unit 51 of the server 50 transmits a process result (first result) of the application processing unit 53 to the client terminal 10. For example, the transmission/reception unit 51 transmits the matching result of the face f4 included in the to-be-processed image data illustrated in FIG. 14 to the client terminal 10.

In step S109, the data integration unit 22 of the client terminal 10 uses the process result (second result) obtained by the application processing unit 21 and the process result (first result) transmitted from the server 50 to generate process-result data, which is a process result of the requested specific processing (generation step). For example, the data integration unit 22 performs the integration processing of the matching result of the faces 1 to 3 obtained by the client terminal 10 and the matching result of the face f4 obtained by the server 50 to generate the face matching result (process-result data) for the image data (i.e., process target data).

In this case, for example, the application processing unit 21 of the client terminal 10 also performs the task 1 ("face detection") and task 3 ("face blur") that are not the allocation target task. For example, when the allocation information is received, the application processing unit 21 performs processing of the task 1 as a pre-processing before performing the processing of the task 2 (allocated processing). In order to make the server 50 to determine the allocation of processing for performing the task 2, the client terminal 10 transmits the notification information 200A including information on the number of faces detected by the task 1 to the server 50. Then, the application processing unit 21 performs the second processing, allocated to the client terminal 10 for the processing of the task 2, to the process result of the task 1. The application processing unit 21 performs the processing of task 3 to the process-result data integrated or generated by the data integration unit 22.

In step S110, the display control unit 13 of the client terminal 10 causes the display 117 to display the process-result data, which is a result of processing the to-be-processed image data (i.e., process target data). In this way, even if the client terminal 10 performs a part of the requested image processing while allocating the remaining image processing to the server 50, the client terminal 10 can provide the process-result data of the image processing requested for the to-be-processed image data (i.e., process target data).

Further, as described above, the second processing allocated to the client terminal 10 and the first processing allocated to the server 50 can be performed in parallel or concurrently. Therefore, even if the client terminal 10 performs a part of the requested image processing while allocating the remaining image processing to the server 50, the client terminal 10 can provide the process-result data of the image processing requested for the to-be-processed image data (i.e., process target data) without causing a longer time for processing the to-be-processed image data (i.e., process target data).

As to the above described information processing system 1A, when the image processing for the specific image data is requested by the user, a part of the image processing is allocated to the client terminal 10 and the remaining part of the image processing is allocated to the server 50 in accordance with the performance of the client terminal 10 and the performance of the server 50, and then the image processing for the specific image data requested by the user is performed by allocating the image processing between the client terminal 10 and the server 50. Therefore, the information processing system 1A can effectively use the processing resources of the client terminal 10 and the processing resources of the server 50 when performing the application processing.

Second Embodiment

Hereinafter, a description is given of an information processing system 1B according to a second embodiment of the present invention. It should be noted that the same configuration and functions as those of the first embodiment are denoted by the same reference numerals, and the description thereof will be omitted. In the information processing system 1B according to the second embodiment, the client terminal 10 transmits a feedback on the second processing performed at the client terminal 10 to the server 50. Based on the feedback received from the client terminal 10, the server 50 updates the processing allocation management table 65B used for determining the allocation of processing for performing the specific processing. With this configuration, the information processing system 1B can set the allocation ratio of the processing for performing the specific processing between the server 50 and the client terminal 10 in view of difference of each of the client terminals 10.

Processing Allocation Management Table:

FIGS. 15A and 15B (FIG. 15) are examples of the processing allocation management table 65B according to the second embodiment. As illustrated in FIG. 15, the processing allocation management table 65B sets different allocation ratios for each of the client terminals 10. Similar to the processing allocation management table 65A in FIG. 10, the server 50 stores the processing allocation management table 65B, which is prepared differently for each one of the servers 50 based on the performance of the servers 50. FIG. 15A is an example of the processing allocation management table 65Ba that is used when the performance of the server 50 is "high." FIG. 15B is an example of the processing allocation management table 65Bb that is used when the performance of the server 50 is "low" or "normal."

In an example case in FIG. 15, the processing allocation management table 65B stores processing information and allocation ratio in association with each other. The processing information of the processing allocation management table 65B is same as that of the processing allocation management table 65A illustrated in FIG. 10. Further, the process contents set in the processing request information correspond to the contents of the specific processing information included in the processing allocation management table 65Ba and the processing allocation management table 65Bb. The terminal identification information is information for identifying the client terminal 10, such as a terminal name or a terminal ID set for the client terminal 10. As illustrated in FIG. 15, the processing allocation management table 65B sets a first allocation ratio associated with the terminal identification information of "0101x" and a second allocation ratio associated with the terminal identification information of "0202y," which are different allocation ratios. The processing allocation management table 65B is an example of the management information.

Processing/Operation in Second Embodiment

Hereinafter, a description is given of processing and operation in the information processing system 1B according to the second embodiment with reference to FIG. 16. FIG. 16 is an example of a sequence diagram illustrating a method of processing information in the information processing system 1B according to the second embodiment.

In step S301, the input reception unit 12 of the client terminal 10 receives a processing request of specific image data input by a user operation. Specifically, the input reception unit 12 receives an image processing request for the specific image data when the user operates a menu, corresponding to an application, displayed on the display 117 under the control of the display control unit 13.

In step S302, when the input reception unit 12 receives the processing request, the notification information generation unit 15 of the client terminal 10 acquires the terminal information 20 illustrated in FIG. 5 from the storage unit 100. Then, the notification information generation unit 15 creates or generates notification information 200B including the processing request information indicating the contents of the requested specific processing, the read terminal information 20, and the terminal identification information identifying the client terminal 10 that is to request the specific processing. The terminal identification information is, for example, a name or terminal ID of the client terminal 10 that has generated the notification information 200B.

In step S303, the transmission/reception unit 11 of the client terminal 10 transmits the notification information 200B to the server 50. With this configuration, the client terminal 10 can provide the contents of the specific processing requested by the user, the specifications (specification values) of the client terminal 10, and the terminal identification information of the client terminal 10 that has requested the specific processing, to the server 50.

Since steps S304 to S310 are similar to steps S104 to S110 in FIG. 13, the description thereof is omitted. When the allocation of processing for performing the specific processing is determined in step S304, the allocation ratio associated with the terminal identification information included in the notification information 200B is used.

In step S311, after the specific processing requested by the user is completed, the transmission/reception unit 11 of the client terminal 10 transmits terminal processing information to the server 50. The terminal processing information includes information associated with the second processing performed at the client terminal 10. The terminal processing information includes, for example, time information indicating a time period required for processing the task allocated to the client terminal 10. Further, the terminal processing information can include not only the time period required for performing the second processing allocated to the client terminal 10 but also a time period required for generating the process-result data, which is a result of processing for the requested specific processing, as the time information.

Figure 17:
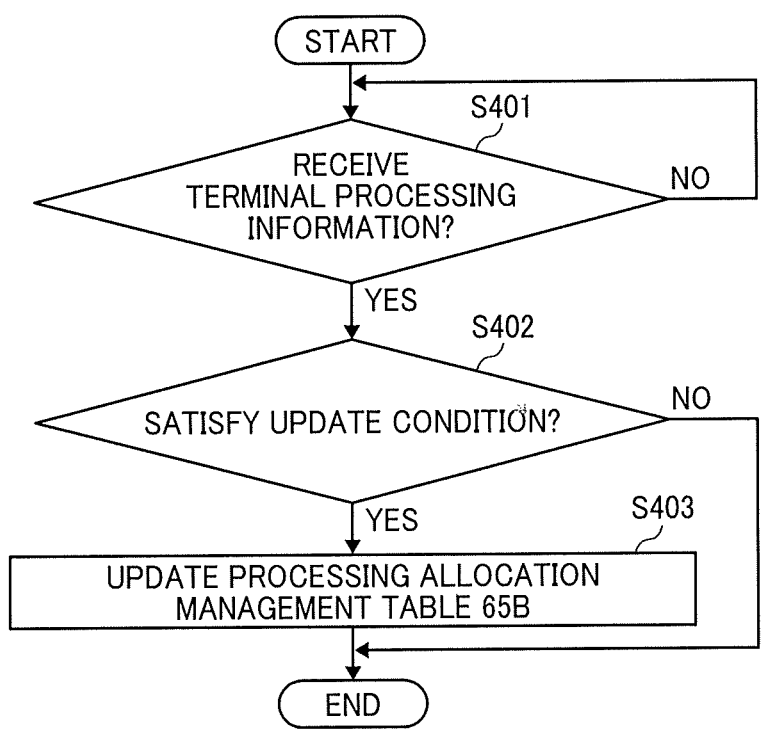
FIG. 17 is an example of a flow chart illustrating the steps of updating a processing allocation management table stored in a server according to the second embodiment.

In step S312, when the management unit 55 of the server 50 receives the terminal processing information via the transmission/reception unit 51, the management unit 55 updates the processing allocation management table 65B stored in the storage unit 500. FIG. 17 is an example of a flow chart illustrating the steps of updating the processing allocation management table 65B stored in the server 50 according to the second embodiment.

In step S401, in response to receiving the terminal processing information transmitted from the client terminal 10 (S401: YES), the transmission/reception unit 51 of the server 50 proceeds the sequence to step 402. On the other hand, the server 50 repeats step 401 until the server 50 receives the terminal processing information (S401: NO).

In step S402, if the terminal processing information satisfies a given update condition (S402: YES), the management unit 55 proceeds the sequence to step 403. Specifically, if the time information included in the terminal processing information is equal to or more than a given time period set in the server 50 (S402: YES), the sequence proceeds to step 403.

The given update condition is not limited to the above example but can be set and changed by the administrator or the like of the server 50. The given update condition can be, for example, a condition indicating that the time information included in the terminal processing information exceeds the given time period, set in the server 50, for a given number of times.

On the other hand, in step S402, if the terminal processing information does not satisfy the given update condition (S402: NO), the management unit 55 of the server 50 ends the sequence.

In step S403, the management unit 55 updates the processing allocation management table 65B. Specifically, if the terminal processing information satisfies the given update condition, the management unit 55 updates the information of the allocation ratio associated with the terminal identification information of the client terminal 10 that has transmitted the terminal processing information. For example, the management unit 55 updates the processing allocation management table 65B by decreasing the ratio of the second processing allocated to the client terminal 10 and by increasing the ratio of the first processing performed by the server 50.

As to the above described the second embodiment, the information processing system 1B can autonomously set the allocation ratio suitable for the specific processing by feeding back the information associated with the second processing performed in the client terminal 10 to the server 50 as an evaluation value. Further, since the information processing system 1B can set the allocation ratio for each client terminal 10 differently, the information processing system 1B can selectively set the allocation ratio depending on a combination of the performance of the client terminal 10 and the performance of the server 50, and the requested specific processing.

Third Embodiment

Hereinafter, a description is given of an information processing system 1C according to a third embodiment of the present invention. The same configuration and functions as those of the first embodiment or the second embodiment are denoted by the same reference numerals, and the description thereof will be omitted. In the information processing system 1C according to the third embodiment, notification information 200C, which is transmitted from the client terminal 10 to the server 50, includes user information of a user who has requested the specific processing. Further, a user's feedback on the second processing performed at the client terminal 10 is transmitted from the client terminal 10 to the server 50. Based on the feedback received from the client terminal 10, the server 50 updates the processing allocation management table 65C used for determining the allocation of processing for performing the specific processing. With this configuration, the information processing system 1B can set the allocation ratio of processing for performing the specific processing depending on the server 50 and each user.

Processing Allocation Management Table:

FIGS. 18A and 18B (FIG. 18) are examples of a processing allocation management table 65C according to the third embodiment. As illustrated in FIG. 18, the processing allocation management table 65C sets different allocation ratios for each user. Similar to the processing allocation management table 65A in FIG. 10, the server 50 stores the processing allocation management table 65C, which is prepared differently for each one of the servers 50 based on the performance of the servers 50. FIG. 18A is an example of the processing allocation management table 65Ca that is used when the performance of the server 50 is "high." FIG. 18B is an example of the processing allocation management table 65Cb that is used when the performance of the server 50 is "low" or "normal."

In an example case in FIG. 18, the processing allocation management table 65C stores the user information, the terminal identification information, the processing information, and the allocation ratio in association with each other. The processing information of the processing allocation management table 65C is same as that of the processing allocation management table 65A illustrated in FIG. 10. Further, the process contents set in the processing request information correspond to the contents of the specific processing information included in the processing allocation management table 65Ca and the processing allocation management table 65Cb. The user identification information is information for identifying a user who uses the application, such as a user name or a user ID. As illustrated in FIG. 18, the processing allocation management table 65C sets a first allocation ratio associated with the user identification information of "user1" and a second allocation ratio associated with the user identification information of "user2," which are different allocation ratios. The processing allocation management table 65C is an example of the management information.

Processing/Operation in Third Embodiment

Figure 19:
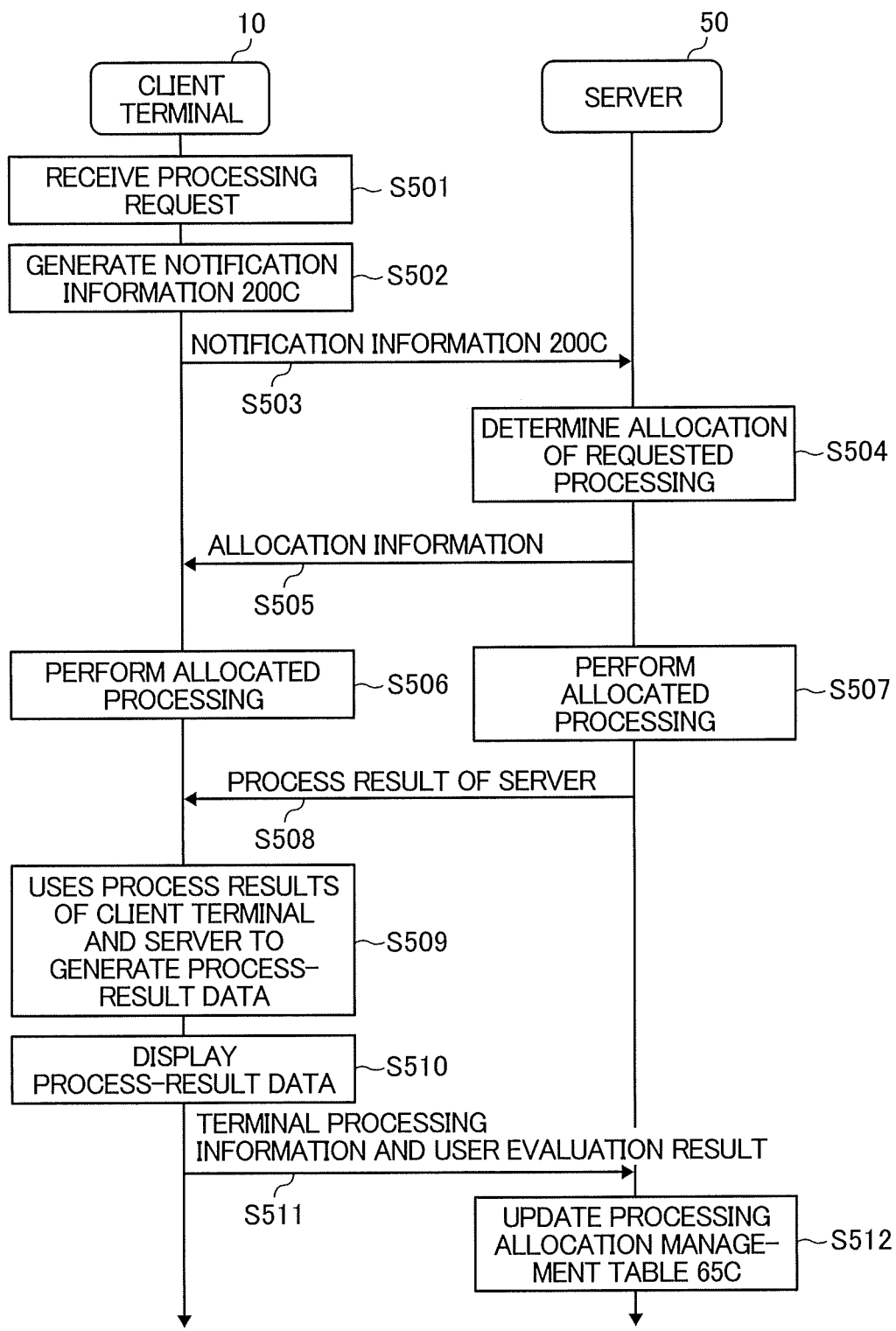
FIG. 19 is an example of a sequence diagram illustrating a method of processing information in an information processing system according to the third embodiment.

FIG. 19 is an example of a sequence diagram illustrating a method of processing information in the information processing system 1C according to the third embodiment.

In step S501, the input reception unit 12 of the client terminal 10 receives a processing request of specific image data input by a user operation. Specifically, the input reception unit 12 receives an image processing request for the specific image data when the user operates a menu, corresponding to an application, displayed on the display 117 under the control of the display control unit 13.

Figure 20:
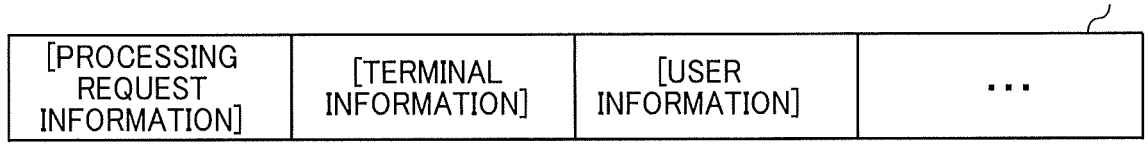
FIG. 20 is an example of a configuration of contents of notification information according to the third embodiment.

In step S502, when the input reception unit 12 receives the processing request, the notification information generation unit 15 of the client terminal 10 acquires the terminal information 20 illustrated in FIG. 5 from the storage unit 100. Then, the notification information generation unit 15 creates or generates notification information 200C including the processing request information indicating the contents of the requested specific processing, the read terminal information 20, and the user identification information identifying the user who has requested the specific processing. FIG. 20 is an example of a configuration of the contents of the notification information 200C according to the third embodiment. As illustrated in FIG. 20, the notification information 200C includes information, such as "processing request information," "terminal information" and "user information."

The "processing request information" is information identifying the contents of the specific processing requested by the user. The processing request information includes, for example, identification information of the specific processing, such as a name of processing and/or identification ID set for the specific processing.

The "terminal information" is information including specifications (specification values) of the client terminal 10, such as the contents of the terminal information 20 illustrated in FIG. 5.

The "user information" is information identifying the user who has requested the specific processing corresponding to "processing request information," such as a user name or a user ID.

In step S503, the transmission/reception unit 11 of the client terminal 10 transmits the notification information 200C to the server 50. With this configuration, the client terminal 10 can provide the contents of the specific processing requested by the user, the specifications (specification values) of the client terminal 10, and the user information indicating the user who has requested the specific processing, to the server 50.

Since steps S504 to S510 are similar to steps S104 to S110 in FIG. 13, the description thereof is omitted. When the allocation of processing for performing the specific processing is determined in step S504, the allocation ratio associated with the terminal identification information included in the notification information 200C is used.

In step S511, after the specific processing requested by the user is completed, the transmission/reception unit 11 of the client terminal 10 transmits the terminal processing information and a user evaluation result to the server 50. The terminal processing information is information associated with the second processing performed at the client terminal 10. The terminal processing information includes, for example, time information indicating a time period required for processing the task allocated to the client terminal 10. Further, the terminal processing information can include not only the time period required for performing the processing allocated to the client terminal 10 but also a time period required for generating process-result data, which is a result of processing for the requested specific processing, as the time information.

Figure 21:
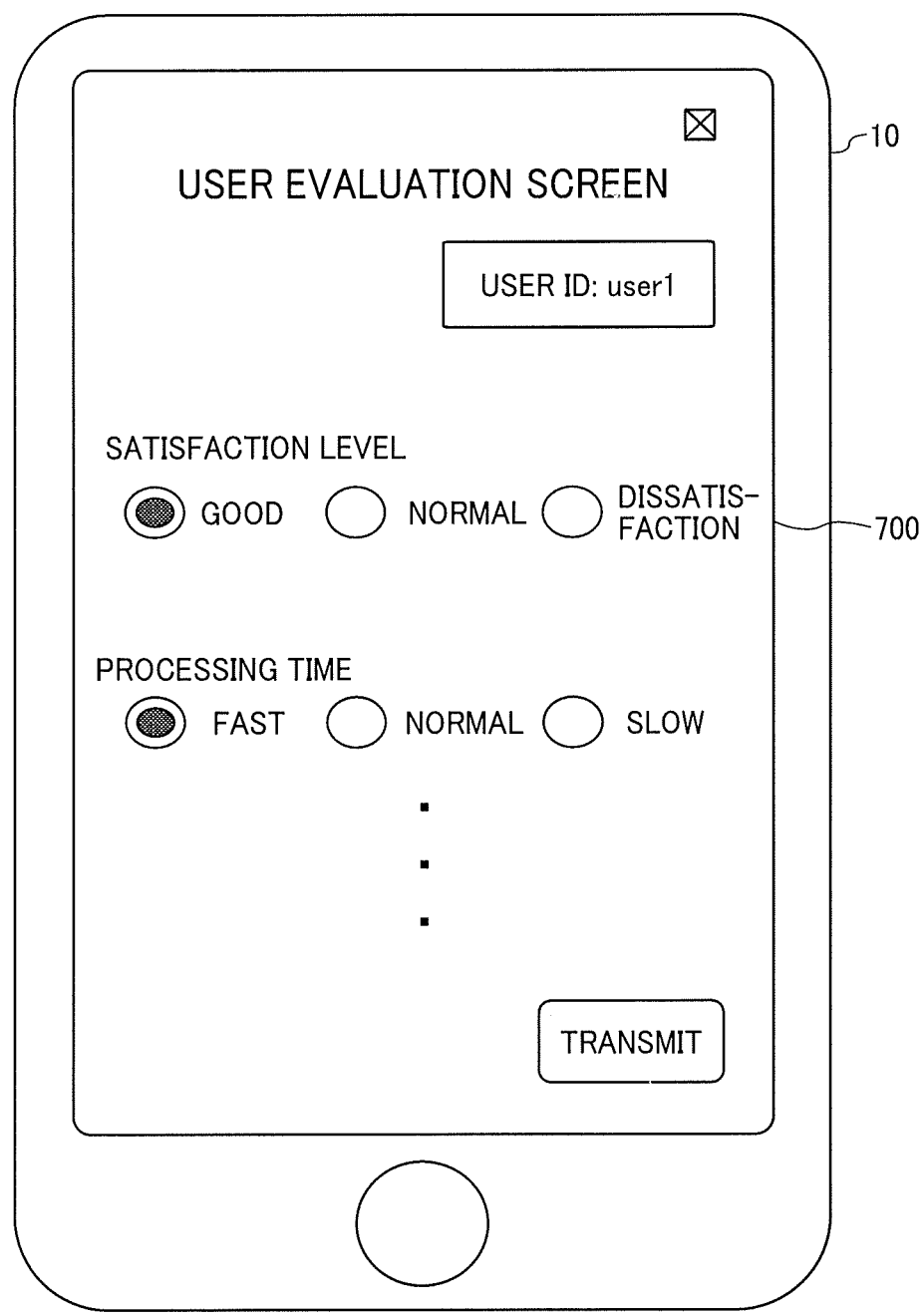
FIG. 21 is an example of a user evaluation screen according to the third embodiment.

The user evaluation result is information of a result evaluated by the user, which can be input via a user evaluation screen 700 displayed on the display 117 after the second processing performed by the application processing unit 21 is completed. FIG. 21 is an example of the user evaluation screen 700 according to the third embodiment. The user evaluation screen 700 is displayed on the display 117 after the second processing performed by the application processing unit 21 is completed. The user evaluation screen 700 includes an input icon for receiving an input of user satisfaction level and an input of processing time of the second processing performed by the application processing unit 21. Further, as illustrated in FIG. 21, the user evaluation screen 700 can associate the input evaluation result with each user using the user ID (user information) included in the user evaluation screen 700.

The user of the client terminal 10 can perform an evaluation of the performed second processing by inputting an evaluation to each item included in the user evaluation screen 700 displayed on the display 117. After inputting the evaluation for each item, the user of the client terminal 10 can transmit the evaluation result from the client terminal 10 to the server 50 by selecting a transmission icon displayed on the user evaluation screen 700 (FIG. 21).

Figure 22:
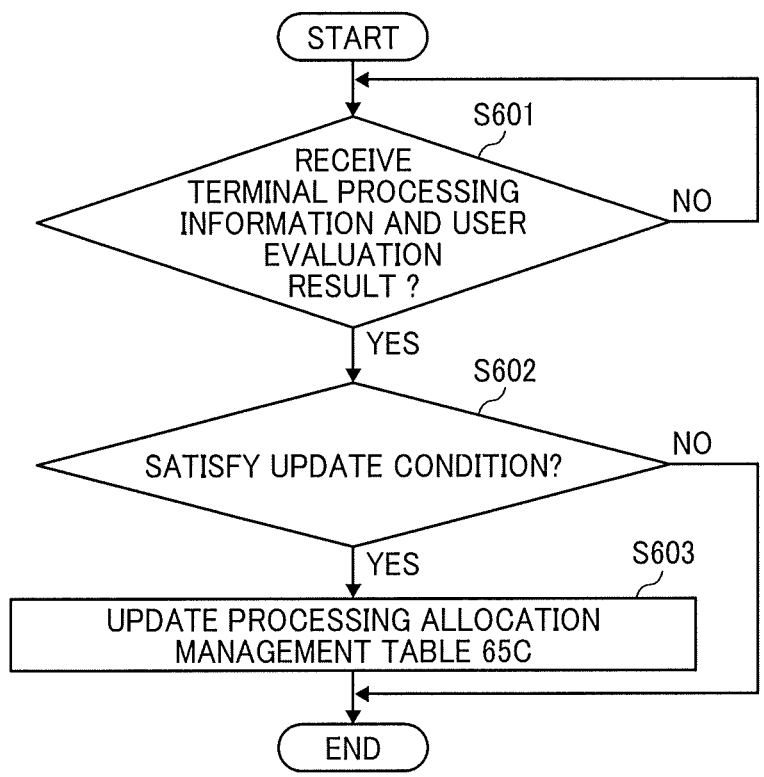
FIG. 22 is an example of a flow chart illustrating the steps of updating a processing allocation management table stored in a server according to the third embodiment.

In step S512, when the management unit 55 of the server 50 receives the terminal processing information and the user evaluation result via the transmission/reception unit 51, the management unit 55 of the server 50 updates the processing allocation management table 65C stored in the storage unit 500. FIG. 22 is an example of a flow chart illustrating the steps of updating the processing allocation management table 65C stored in the server 50 according to the third embodiment.

In step S601, in response to receiving the terminal processing information and the user evaluation result transmitted from the client terminal 10 (S601: YES), the transmission/reception unit 51 of the server 50 proceeds the sequence to step S602. On the other hand, the server 50 repeats step S601 until the server 50 receives the terminal processing information and the user evaluation result (S601: NO).

In step S602, if the user evaluation result satisfies a given update condition (S602: YES), the management unit 55 of the server 50 proceeds the sequence to step S603. For example, if "dissatisfaction" is selected for a given number of times or more as the user evaluation result, the sequence proceeds to step S603.

The given update condition is not limited to the above condition but can be set and changed by the administrator or the like of the server 50. The given update condition can be, for example, a condition that the number of times that "slow" is selected for the processing time included in the user evaluation result becomes a given number of times or more.

On the other hand, in step S602, if the user evaluation result does not satisfy the given update condition (S602: NO), the management unit 55 of the server 50 ends the sequence.

In step S603, the management unit 55 updates the processing allocation management table 65C. Specifically, if the user evaluation result satisfies the given update condition, the management unit 55 updates the information of the allocation ratio associated with the user identification information of the user who has input the user evaluation result. For example, the management unit 55 updates the processing allocation management table 65C by decreasing the ratio of the second processing allocated to the client terminal 10 and by increasing the ratio of the first processing performed by the server 50.

As to the above described third embodiment, the information processing system 1C can autonomously set the allocation ratio suitable for the specific user by feeding back the information including the user's subjective evaluation on the second processing performed at the client terminal 10 to the server 50.

As described above, the server according to any one of the embodiments is the server 50 that can be connected to the client terminal 10 via the communication network 5. The server 50 receives the processing request information indicating the contents of the requested specific processing from the client terminal 10, and the server 50 determines the allocation of the second processing to be performed by the client terminal 10 and the allocation of the first processing to be performed by the server 50 for the specific processing included in the processing request information based on the notification information 200 including the specifications of the client terminal 10. Then, the server 50 transmits the allocation information indicating the second processing allocated for the client terminal 10 to the client terminal 10 and performs the first processing allocated to the server 50.

Therefore, the server 50 can allocate the second processing to the client terminal 10 and the first processing to the server 50 based on the performance of the client terminal 10 to utilize processing resources of the client terminal 10 and processing resources of the server 50 effectively and to provide the process-result data for the specific processing requested by the user.

Further, the server 50 receives the notification information 200A including the processing request information indicating the contents of the requested specific processing and the terminal information 20 indicating the specifications of the client terminal 10. Therefore, the server 50 can determine the allocation of processing for performing the specific processing requested by the user between the client terminal 10 and the server 50 based on the specifications of the client terminal 10 received from the client terminal 10 to optimize the utilization rate of the processing resources of the client terminal 10 and the processing resources of the server 50 and to reduce the time period required for performing the specific processing requested by the user.

Further, as to the specific processing that can be performed in parallel or concurrently between the client terminal 10 and the server 50, the server 50 determines the allocation of the second processing to be performed by the client terminal 10 and the allocation of the first processing to be performed by the application processing unit 53 (an example of the first processing unit) of the server 50. Therefore, the server 50 can provide the process-result data for the requested specific processing without causing a longer time for performing the requested specific processing.

Further, the server 50 determines the allocation of the second processing to be performed by the client terminal 10 and the allocation of the first processing to be performed by the application processing unit 53 (an example of the first processing unit) of the server 50 based on the operating state information 60 indicating the operating state of the server 50 and the terminal information 20 indicating the specifications of the client terminal 10. Therefore, the server 50 can determine the allocation of processing for performing the specific processing requested by the user between the client terminal 10 and the server 50 based on the specifications of the client terminal 10 and the operating state of the server 50 to optimize the utilization rate of the processing resources of the client terminal 10 and the processing resources of the server 50 and to reduce the time period required for performing the specific processing requested by the user.

Further, the server 50 stores the processing allocation management table 65A (an example of management information), which associates the processing information indicating the contents of the specific processing and the allocation ratio of processing for performing the specific processing included in the processing information between the client terminal 10 and the application processing unit 53 (an example of first processing unit) of the server 50, and determines the allocation of the second processing to be performed by the client terminal 10 and the allocation of the first processing to be performed by the application processing unit 53 of the server 50 based on the terminal information 20 indicating the specifications of the client terminal 10 and the processing allocation management table 65A. Therefore, the server 50 can determine the allocation of the processing for the client terminal 10 and the server 50 for each of the requested specific processing based on the specifications of the client terminal 10 by storing the allocation ratio of the second processing settable for the client terminal 10 and the first processing settable for the server 50 for each of the requested specific processing.

Further, the server 50 stores the processing allocation management table 65B (an example of management information), which associates the allocation ratio of the processing included in the processing information with each terminal identification information identifying each client terminal 10, and updates the allocation ratio associated with the terminal identification information of the client terminal 10, which has transmitted the terminal processing information, based on the terminal processing information of the client terminal 10 including the time information indicating the time period required for performing the second processing allocated to the client terminal 10. Therefore, the server 50 can autonomously set the allocation ratio suitable for each client terminal 10 by receiving the time information associated with the second processing performed at the client terminal 10, from the client terminal 10.

Further, the server 50 stores the processing allocation management table 65C (an example of management information), which associates the allocation ratio of the processing included in the processing information with each user information (an example of user identification information) identifying the user, and updates the allocation ratio associated with the user information of the user who has input the user evaluation result based on the user evaluation result (an example of evaluation information) indicating the user evaluation on the second processing allocated to the client terminal 10, which is received from the client terminal 10. Therefore, the server 50 can autonomously set the allocation ratio of processing for performing the specific processing for each user by receiving the user's evaluation result on the second processing performed at the client terminal 10, from the client terminal 10

Further, the client terminal of any one of the above described embodiments is the client terminal 10 that receives a request for a specific processing. The client terminal 10 transmits the processing request information indicating the contents of the requested specific processing to the server 50 connected via the communication network 5, and receives the allocation information indicating the second processing allocated to the client terminal 10 for the specific processing included in the processing request information, which is determined based on the terminal information 20 indicating the specifications of the client terminal 10, from the server 50. Then, the client terminal 10 generates the process-result data for the requested specific processing using the process result (second result) of the second processing allocated to and performed by the client terminal 10 and the process result (first result) of the first processing allocated to and performed by the server 50.

Therefore, the client terminal 10 can generate the process-result data for the specific processing requested by the user by using the process results of the processing allocated to the client terminal 10 and the server 50 based on the performance of the client terminal 10, and thereby the client terminal 10 can utilize the processing resources of the client terminal 10 effectively and provide the process-result data for the specific processing requested by the user.

As the above described embodiments, a method of processing information can be performed by the client terminal 10. The method includes receiving a request for a specific processing at the client terminal 10 (terminal apparatus), transmitting processing request information indicating contents of the specific processing to the server 50 (information processing apparatus) connected to the client terminal 10 via the communication network 5, receiving, from the server 50, allocation information indicating the second processing allocated to the client terminal 10, in which the server 50 determines an allocation of the second processing to be performed by the client terminal 10 and the first processing to be performed by the server 50 for performing the specific processing indicated in the processing request information based on terminal information indicating specification of the client terminal 10, the first processing and the second processing constituting the specific processing, performing the second processing allocated to the client terminal 10 to obtain the second result of the second processing, receiving the first result of the first processing performed by the server 50, and generating process-result data for the specific processing based on the second result of the second processing performed by the client terminal 10 and the first result of the first processing performed by the server 50.

Therefore, as to the method of processing information according to the above described embodiments, the process-result data for the specific processing requested by the user can be generated by using the process results of the processing allocated to and performed at the client terminal 10 and the server 50 based on the performance of the client terminal 10, thereby the client terminal 10 can utilize the processing resources of the client terminal 10 effectively and provide the process-result data for the specific processing requested by the user.

Conventional technique of allocating the processing performed for image data and audio data between client terminals and servers is known. For example, in one technique, a client terminal calculates a degree of interest on an image from information on an operation performed by a user and image information, and then the client terminal determines whether the client or the server performs image processing based on the calculated interest degree.

However, in the conventional method, since only one of the client and the server performs the image processing, a node (i.e., client terminal or server) that does not perform the image processing exists. Therefore, in the conventional method, the processing resources of the client terminal and the processing resources of the server cannot be utilized effectively.

As to the above described embodiments, the processing resources of the terminal apparatus and the processing resources of the information processing apparatus can be effectively utilized.

The functions of each of the above described embodiments can be implemented by computer executable programs written in legacy programming languages and object-oriented programming languages, such as assembler, C, C++, C #, Java (registered trademark), etc., and the programs for performing the functions of each of the above described embodiments can be distributed through the electronic communication line.

Further, the programs for performing the functions of each of the above described embodiments can also be stored in a computer-readable recording medium such as ROM, electrically erasable programmable read-only memory (EE-PROM), erasable programmable read-only memory (EPROM), flash memory, flexible disk, compact disc ROM (CD-ROM), compact disc-rewritable (CD-RW), digital versatile disk (DVD)-ROM, DVD-RAM, DVD-RW, Blu-Ray disc, secure digital (SD) card, magneto-optical disc (MO), and the like.

Further, some or all of the functions of each of the above described embodiments can be implemented on a programmable device (PD) such as field programmable gate array (FPGA) or can be implemented as an application specific integrated circuit (ASIC), and can be distributed by a recording medium as data described by hardware description language (HDL), very-high speed integrated circuits hardware description language (VHDL) and Verilog HDL, which can be downloaded to the PD to implement the functions of each of the embodiments on the PD.

Although the server, the client terminal, the method of processing information, and the program according to the embodiments have been described, the present invention is not limited to the above described embodiments, but can be changed within the scope of those skilled in the art, such as addition of other embodiment, modification, or deletion of the embodiments, and the scope of the embodiments is within the scope of the present invention insofar as the effects of the present invention can be achieved.

Numerous additional modifications and variations are possible in light of the above teachings. It is therefore to be understood that, within the scope of the appended claims, the disclosure of this patent specification can be practiced otherwise than as specifically described herein. Any one of the above-described operations may be performed in various other ways, for example, in an order different from the one described above.

Each of the functions of the above described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. An information processing apparatus, comprising:
   circuitry configured to:
   receive processing request information, indicating contents of a specific processing, from a terminal apparatus connected to the information processing apparatus via a network;
   determine an allocation of processing, for performing the specific processing indicated in the processing request information, by allocating first processing to be performed by the information processing apparatus and second processing to be performed by the terminal apparatus based on terminal information indicating specification information of the terminal apparatus, the first processing and the second processing constituting the specific processing;
   transmit, to the terminal apparatus, allocation information indicating the second processing allocated to the terminal apparatus; and
   perform the first processing allocated to the information processing apparatus.

2. The information processing apparatus according to claim 1, wherein the circuitry is configured to receive the terminal information together with the processing request information from the terminal apparatus.

3. The information processing apparatus according to claim 1, wherein the second processing allocated to the terminal apparatus and the first processing allocated to the information processing apparatus are respectively performed concurrently at the terminal apparatus and the information processing apparatus.

4. The information processing apparatus according to claim 1, wherein the circuitry is configured to determine the first processing to be performed by the information processing apparatus and the second processing to be performed by the terminal apparatus based on the terminal information of the terminal apparatus and operating state information indicating an operating state of the information processing apparatus.

5. The information processing apparatus according to claim 1, further comprising:

a memory that stores management information associating the processing request information indicating contents of the specific processing and an allocation ratio, wherein the allocation ratio is a ratio of the first processing to be performed by the information processing apparatus and the second processing to be performed by the terminal apparatus, the first processing and the second processing constitute the specific processing indicated by the processing request information, and the circuitry is configured to determine the allocation ratio based on the terminal information and the management information.

6. The information processing apparatus according to claim 5, wherein the memory stores an allocation ratio, corresponding to each terminal apparatus of one or more terminal apparatuses, in association with terminal identification information identifying a corresponding terminal apparatus of the one or more terminal apparatuses, and the circuitry is further configured to, for each terminal apparatus of the one or more terminal apparatuses:

receive terminal processing information that includes information of a time period required for performing the second processing allocated to the terminal apparatus from the terminal apparatus, and update the allocation ratio associated with the terminal identification information of the terminal apparatus based on the terminal processing information received from the terminal apparatus.

7. The information processing apparatus according to claim 5, wherein the memory stores, for each user of one or more users, the allocation ratio in association with user identification information identifying the user, and the circuitry is further configured to, for each user of the one or more users:

receive evaluation information that indicates an evaluation of the user on the second processing allocated to and performed by the terminal apparatus from the terminal apparatus, and update the allocation ratio associated with the user identification information of the user based on the received evaluation information.

8. A terminal apparatus, comprising:

circuitry configured to receive a request for a specific processing;

transmit processing request information, indicating contents of the specific processing, to an information processing apparatus connected to the terminal apparatus via a network;

receive, from the information processing apparatus, allocation information that indicates a second processing allocated to the terminal apparatus, the information processing apparatus determining an allocation of the second processing to be performed by the terminal apparatus and a first processing to be performed by the information processing apparatus based on terminal information indicating specification information of the terminal apparatus, the first processing and the second processing constituting the specific processing indicated by the processing request information;

perform the second processing allocated to the terminal apparatus to obtain a second result of the second processing;

receive a first result of the first processing performed by the information processing apparatus; and generate process-result data for the specific processing based on the second result of the second processing performed by the terminal apparatus and the first result of the first processing performed by the information processing apparatus.

9. A method of processing information at a terminal apparatus, the method comprising:

receiving a request for a specific processing;

transmitting processing request information, indicating contents of the specific processing, to an information processing apparatus connected to the terminal apparatus via a network;

receiving, from the information processing apparatus, allocation information that indicates a second processing allocated to the terminal apparatus, the information processing apparatus determining an allocation of the second processing to be performed by the terminal apparatus and first processing to be performed by the information processing apparatus based on terminal information indicating specification information of the terminal apparatus, the first processing and the second processing constituting the specific processing indicated by the processing request information;

performing the second processing allocated to the terminal apparatus to obtain a second result of the second processing;

receiving a first result of the first processing performed by the information processing apparatus; and generating process-result data for the specific processing based on the second result of the second processing performed by the terminal apparatus and the first result of the first processing performed by the information processing apparatus.

10. A non-transitory computer readable storage medium storing one or more instructions that, when executed by one or more processors, cause the one or more processors to execute the method of claim 9.

* * * * *